United States Patent [19]

Katagiri et al.

[11] Patent Number: 4,731,745
[45] Date of Patent: Mar. 15, 1988

[54] AUTOMATIC DIMENSION ANALYZER

[75] Inventors: Kiyoo Katagiri, Joetsu; Kozo Kasukawa, Ibaraki; Shigenaga Manabe, Tokyo, all of Japan

[73] Assignee: Shin-Etsu Engineering Co., Ltd., Japan

[21] Appl. No.: 677,599

[22] Filed: Dec. 3, 1984

[51] Int. Cl.[4] .......... G01B 11/14; G06K 9/46; H04N 7/18
[52] U.S. Cl. .................. 364/560; 358/107; 356/372; 33/1 M; 382/25
[58] Field of Search ............ 364/560, 562–564, 364/478, 513; 33/1 M, 503, 504; 356/372, 380, 383, 384; 382/25, 6, 8; 358/101, 106, 107

[56] References Cited

U.S. PATENT DOCUMENTS

| | | | |
|---|---|---|---|
| 3,865,495 | 2/1975 | Morton | 356/380 |
| 3,909,519 | 9/1975 | Page, Jr. | 358/107 |
| 4,045,772 | 8/1977 | Bouton et al. | 382/6 |
| 4,092,669 | 5/1978 | Brasnett | 356/372 X |
| 4,183,013 | 1/1980 | Agrawala et al. | 382/25 X |
| 4,202,037 | 5/1980 | Glaser et al. | 364/518 |
| 4,207,594 | 6/1980 | Morris et al. | 358/107 |
| 4,295,198 | 10/1981 | Copeland et al. | 382/6 |
| 4,301,470 | 11/1981 | Pagany | 358/101 |
| 4,352,125 | 9/1982 | Guth | 358/101 |
| 4,364,086 | 12/1982 | Guth | 358/101 |
| 4,390,955 | 6/1983 | Arimura | 364/490 |
| 4,403,294 | 9/1983 | Hamada et al. | 358/106 X |
| 4,531,192 | 7/1985 | Cook | 364/513 |
| 4,538,299 | 8/1985 | DeForest | 382/6 X |
| 4,541,722 | 9/1985 | Jenks | 356/384 X |
| 4,630,225 | 12/1986 | Hisano | 382/8 X |

FOREIGN PATENT DOCUMENTS 2343994 10/1977 France .

OTHER PUBLICATIONS

Computer Design, vol. 21, No. 8, Aug. 1982, p. 24, Winchester, Mass., US; J. Aseo: "Machine Vision System Inspects 100% of Manufactured Parts".

Primary Examiner—Errol A. Krass
Assistant Examiner—Joseph L. Dixon
Attorney, Agent, or Firm—Lowe, Price, LeBlanc, Becker & Shur

[57] ABSTRACT

An automatic dimension analyzer is disclosed which comprises a power driven table on which an object being measured is placed, the table being movable in orthogonal directions, and an optical system for forming an optical image of the object in a sample point field. The sample point field is electronically scanned in a rectangular raster format to produce sample point data bits each representing a sample point having a predetermined optical level. A cursor generator is synchronized with the raster to generate a cursor in the sample point field. A coincidence detector is provided to detect a coincidence between a sample point data bit and the cursor. Measurement instructions are stored in sequentially addressible locations of a memory through a data entry means. A microprocessor addresses the memory locations to retrieve the instructions to cause one of the table and the cursor to move relative to the other so that sample points derived from the object move toward the cursor and detect the position of the table or cursor relative to a reference upon the detection of a coincidence by the coincidence detector.

36 Claims, 23 Drawing Figures

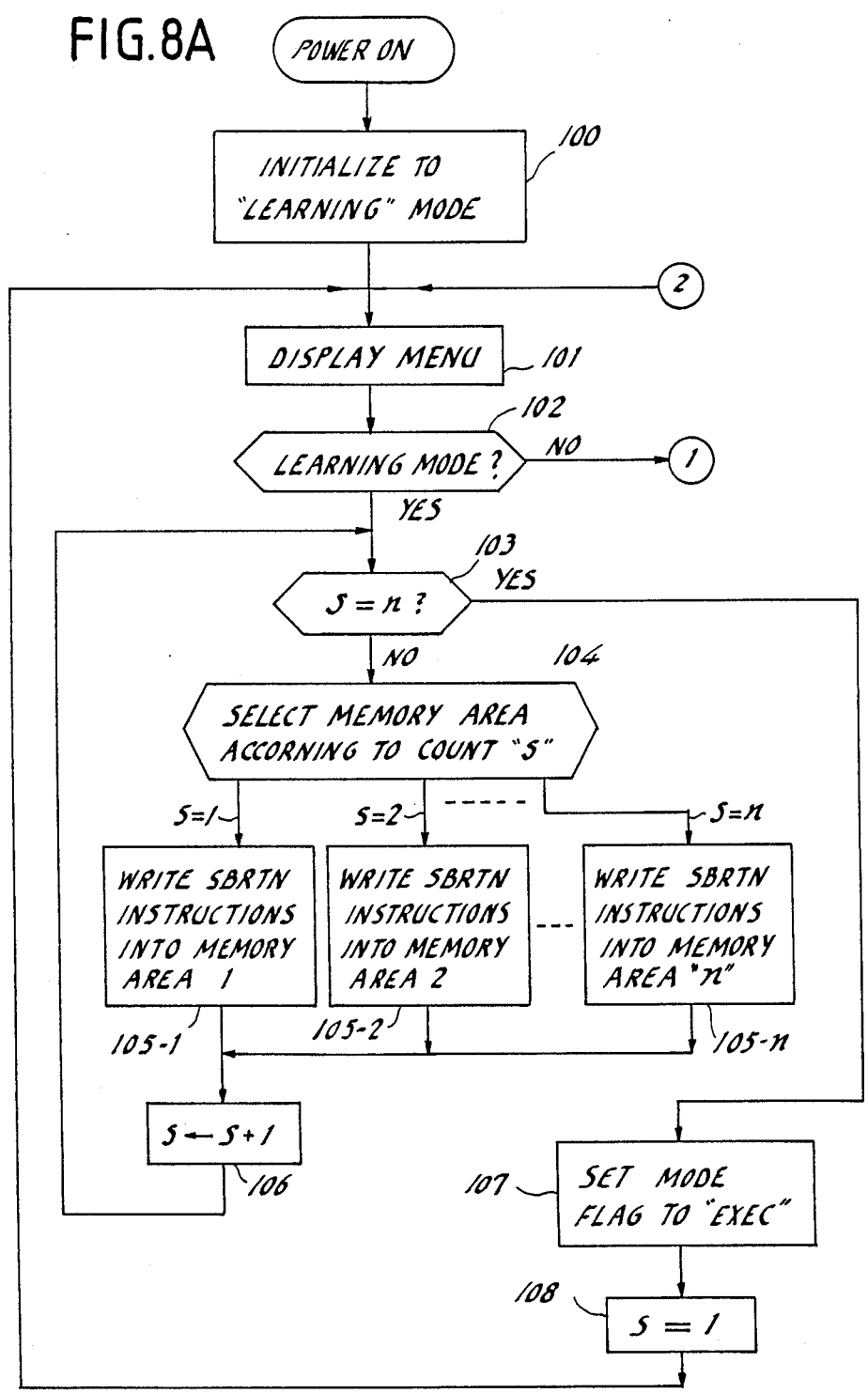

AUTOMATIC FOCUSING

AUTOMATIC DIMENSION ANALYZER

BACKGROUND OF THE INVENTION

The present invention relates generally to an electronic dimension analyzer for sequentially measuring the dimensions of objects. The invention is particularly useful fo speedily analyzing the dimensions of small-sized objects with precision.

Recent advances in electronic technologies require a high speed precision measuring apparatus which enables automatic measurement of lengths and widths on the surface of electronic parts such as magnetic transducer heads by detecting the peripheral edges of the workpiece being measured.

SUMMARY OF THE INVENTION

An object of the present invention is to provide an automatic dimension analyzer which permits automatic measurement of dimensions at high speed and precision.

The dimension analyzer of the invention comprises a motor driven table for mounting an object to be measured which is movable in orthogonal directions, and an optical system for forming an optical image of the object in a sample point field. The sample point field is electronically scanned in a rectangular raster format to produce sample point data bits each representing a sample point having a predetermined optical level. A coincidence detector is provided to detect a coincidence between a sample point data bit and a cursor which is defined in the sample point field. Measurement instructions are stored in sequentially addressible locations of a memory through a data entry means. A microprocessor addresses the memory locations to retrieve the instructions to cause the table or cursor to move relative to each other so that sample points move toward the cursor and detect the position of the table or cursor relative to a reference point upon the detection of a coincidence by the coincidence detector.

According to one feature of the invention, a series of various measurement instructions are stored into memory to move the table in specified directions toward the cursor to cause coincidence to occur between it and an edge of the object. The microprocessor responds to the detection of a coincidence by th coincidence detector by determining the position of the table and deriving the distance between points of measurement from the successively derived table positions.

According to a further feature of the invention, an outermost point of a peripheral edge of the object being analyzed is detected when the number of sample poing data bits indicating the high optical level reaches a minimum value and an innermost point of the edge is detected by reversing the polarity of the sample point data bits and by detecting when the number of polarity-reversed data bits reaches a maximum value.

According to a still further feature of the invention, a pair of first and second parallel cursors is defined in the sample point field. The table is first moved at a relatively high speed and reduced to a lower speed in response to the detection of a coincidence by the coincidence detector when the edge of the object crosses the first cursor, allowing the edge to be detected by the second cursor at the reduced speed. Preferably, the table is moved at a highest speed upon the detection of one measurement point over a preset distance to a point adjacent to a second measurement point.

The invention further allows automatic measurement by generating at least one pair of cursors in the sample point field and successively moving them toward object's peripheral edges from predetermined initial positions to determine the distance between the edges when they coincide with the cursors.

According to a still further feature of the invention, the position of the optical system is controlled in accordance with the surface irregularities on the objects being measured.

BRIEF DESCRIPTION OF THE DRAWINGS

The present invention will be described in further detail with reference to the accompanying drawings, in which:

FIGS. 8A and 8B are flowcharts describing the operation of the main routine of the microprocessor of FIGS. 1 and 2 according to the invention;

DETAILED DESCRIPTION

Figure 1:
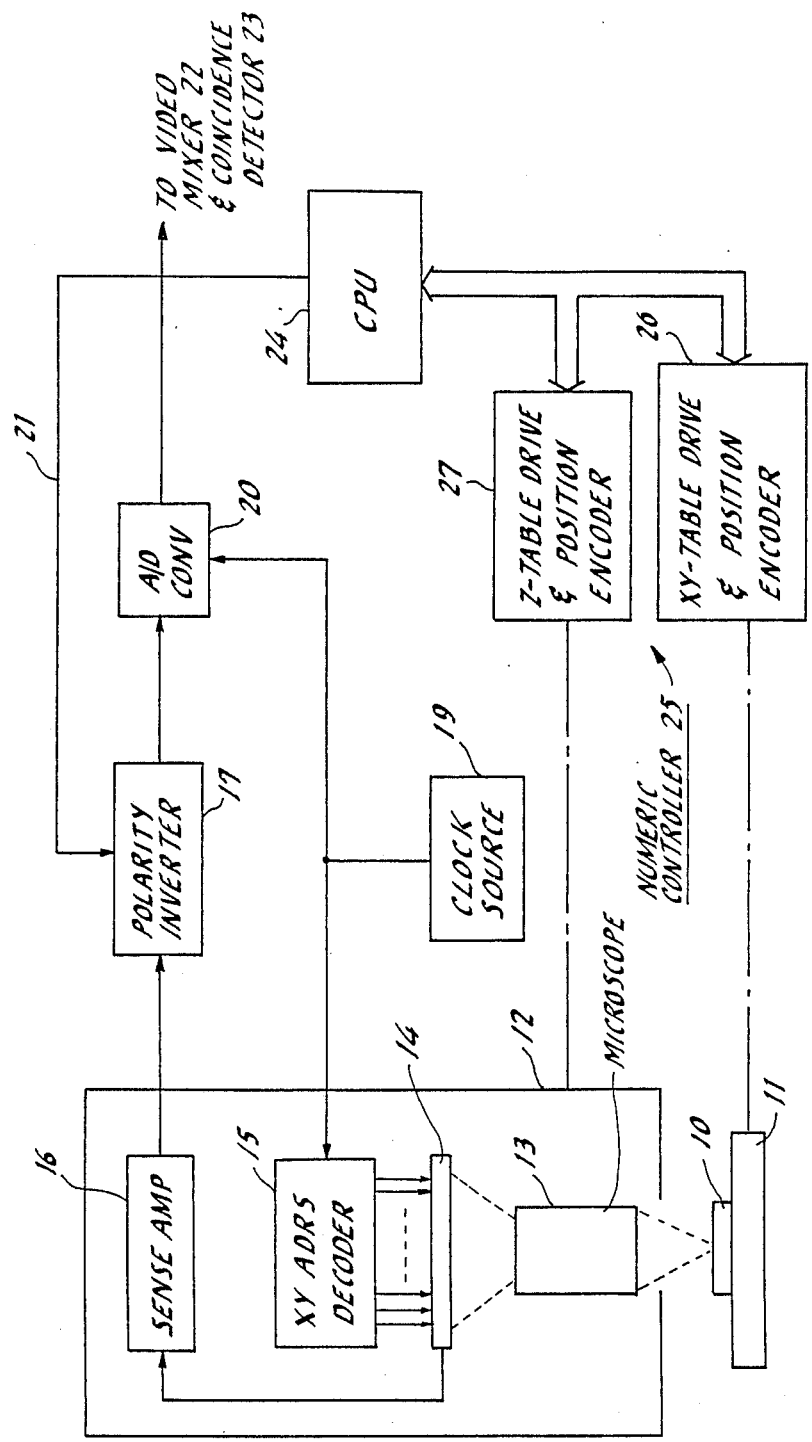
FIGS. 1 and 2 are block diagrams of the general structure of the automatic dimension analyzer according to the present invention.
Figure 2:
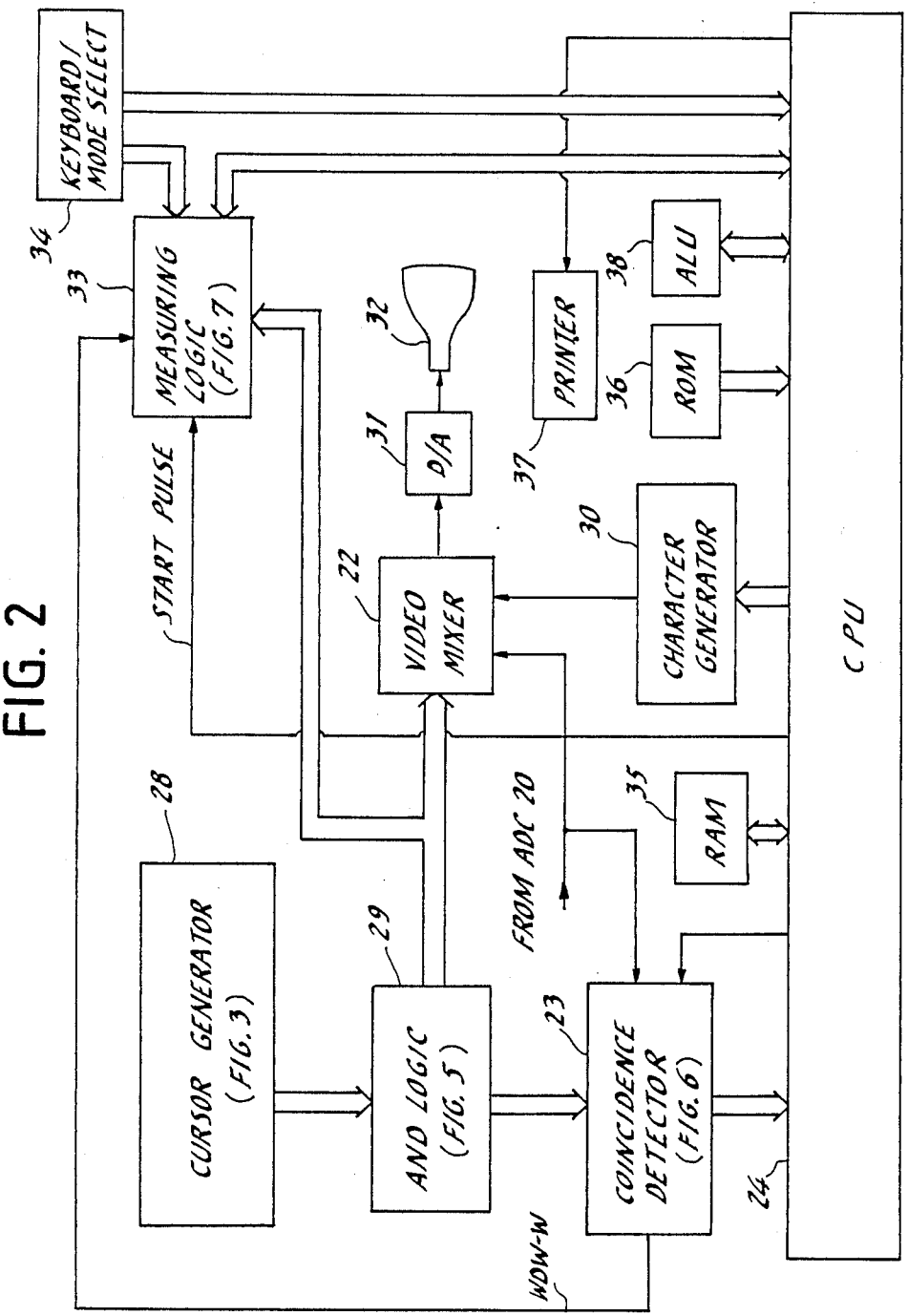

FIGS. 1 and 2 illustrate the general structure of the automatic microscopic dimension analyzer according to the present invention. In FIG. 1, an object 10 under measurement is placed on an X-Y table 11 which moves in orthogonal directions on a horizontal plane with respect to a microscope 13 mounted on a vertically movable support, or Z table 12. The object 10 is illuminated by a suitable light source, not shown. The Z table 12 is automatically controlled in a proper vertical position to form a magnified sharply focused image of the illuminated object 10 on a solid-state area imager 14 which presents a sample point field where the optical image is converted to an electronic image. The imager 14 is driven by an XY address decoder 15 clocked by source 19 to scan the sample point field in a rectangular raster format to generate a video signal, which is derived from a sense amplifier 16 and passed through a polarity inverter 17 to an analog-digital converter 20. AD converter 20 is driven by clock source 19 to sample the video signal into digital samples or data bits each representing a sample point, or pixel, having a high optical level, i.e., binary "1" represents the high, or "white" optical level of the surface of object 10 and binary "0" represents the low, or "black" level of the background of the object. Therefore, the sample point field is resolved into a matrix of 256 rows and 512 columns.

The system is operated by a microcomputer including a microprocessor (CPU) 24 which provides control signals to various parts of the system. As will be understood as the description proceeds, microprocessor 24 controls a numeric controller 25 comprising an X-Y table drive and position encoder 26 which drives the X-Y table in orthogonal directions with respect to each other and a Z-table drive and position encoder 27 which controls the vertical position of the Z table.

In FIG. 2, data bits from analog-digital converter 20 are applied to a video mixer 22 and combined with signals from a cursor generator 28 through an AND logic 29 and signals from a character generator 30. The output of mixer 22 is converted to analog from by a DA converter 31 and displayed on a cathode-ray tube 32.

Figure 3:
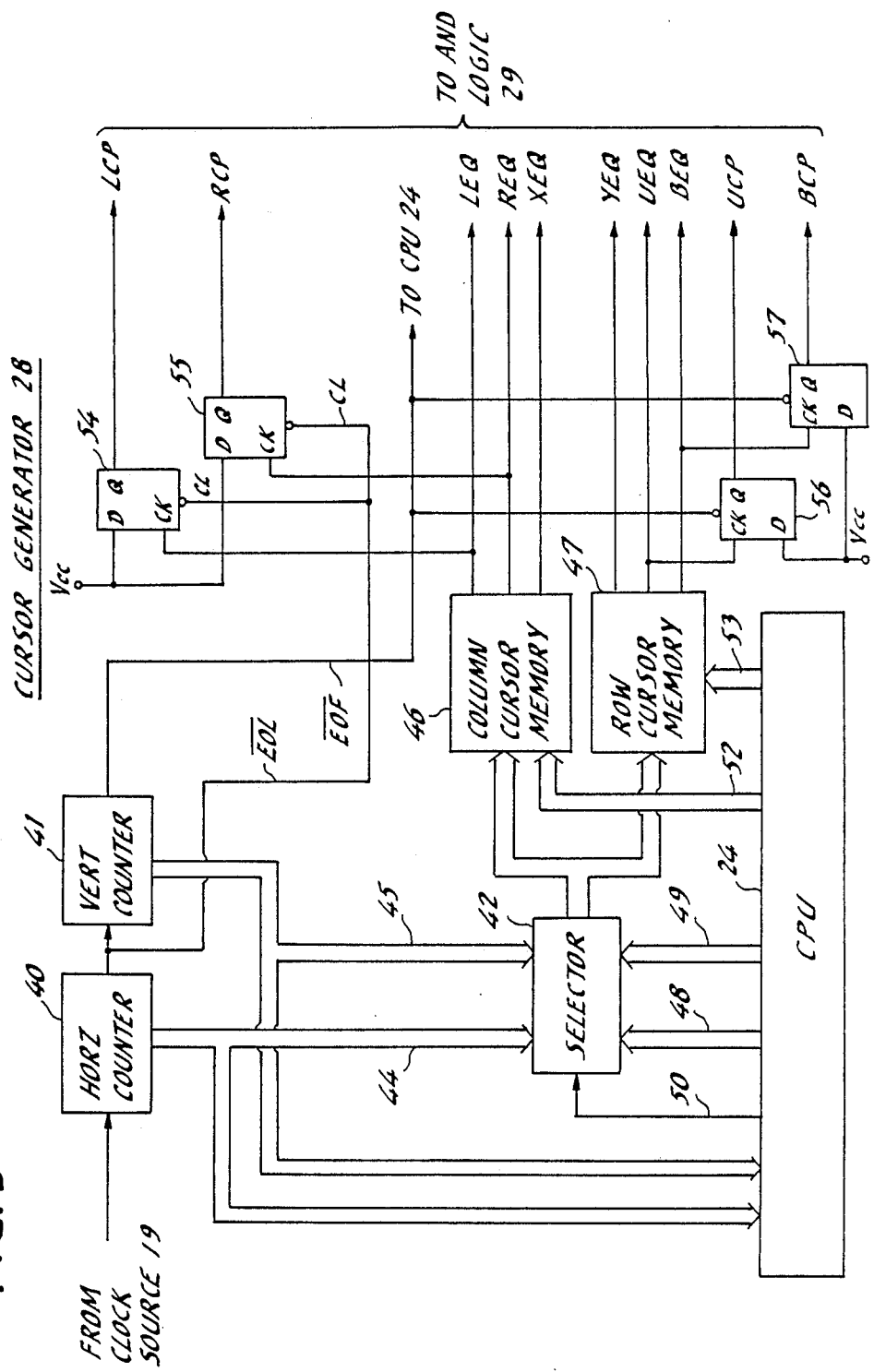
FIG. 3 is a block diagram of the cursor generator of FIG. 2.

Cursor generator 28, which is illustrated in detail in FIG. 3, includes a 9-bit horizontal counter 40 which counts pulses from clock source 19 to provide a carry pulse indicating the end of horizontal line (EOL) at the full count of 512 bits and a 9-bit column address code which increments in response to each clock pulse to identify the location of each sample point on each row of the matrixed sample point field. An 8-bit vertical counter 41 is clocked by the end-of-line pulse to generate a carry pulse indicating the end of frame (EOF) at the full count of 256 bits and further generate an 8-bit row address code which increments in response to each end-of-line pulse to identify the location of each row of the matrixed sample point field.

A column-cursor read-write matrix memory 46 has a memory address field corresponding to the sample point field. In a write mode, memory 46 is addressed by a 9-bit column address code and an 8-bit row address code supplied respectively on buses 48 and 49 from CPU 24 through a read/write selector 42, which is enabled by a command signal on conductor 50, to store binary 1's into the addressed columns. In a read mode, selector 42 is switched to couple the corresponding column and row address codes from counters 40 and 41 developed on buses 44 and 45 to generate a series of column cursor pulses which will align themselves along the corresponding columns of the sample point field to develop vertical lines, or column cursors.

Similarly, a row-cursor read-write matrix memory 47, identical in construction to memory 46, is in a write mode to store binary 1's supplied from CPU 24 on bus 53 into rows of the memory as specified by row and column address codes from CPU 24 and is addressed in a read mode in response to the address codes from counters 40 and 41 to generate a series of row cursor pulses which will align themselves along the corresponding rows of the sample point field to develop horizontal lines, or row cursors.

Alternatively, column and row cursor pulses could be generated by the use of a set of digital comparators each comparing the column and row address codes provided from counters 40 and 41 with those supplied from CPU 24 to generate an equality pulse when a coincidence occurs between them. The equality pulses from the comparators may be applied to associated gates to pass the clock pulse to output terminals.

The column and row address codes on buses 48 and 49 can be incremented by CPU 24 to rewrite binary 1's into the next adjacent columns and rows in response to address increment variables which will be generated in measurement subroutines to be described, so that each cursor can be shifted one pixel to the next in either direction at frame intervals.

Figure 4:
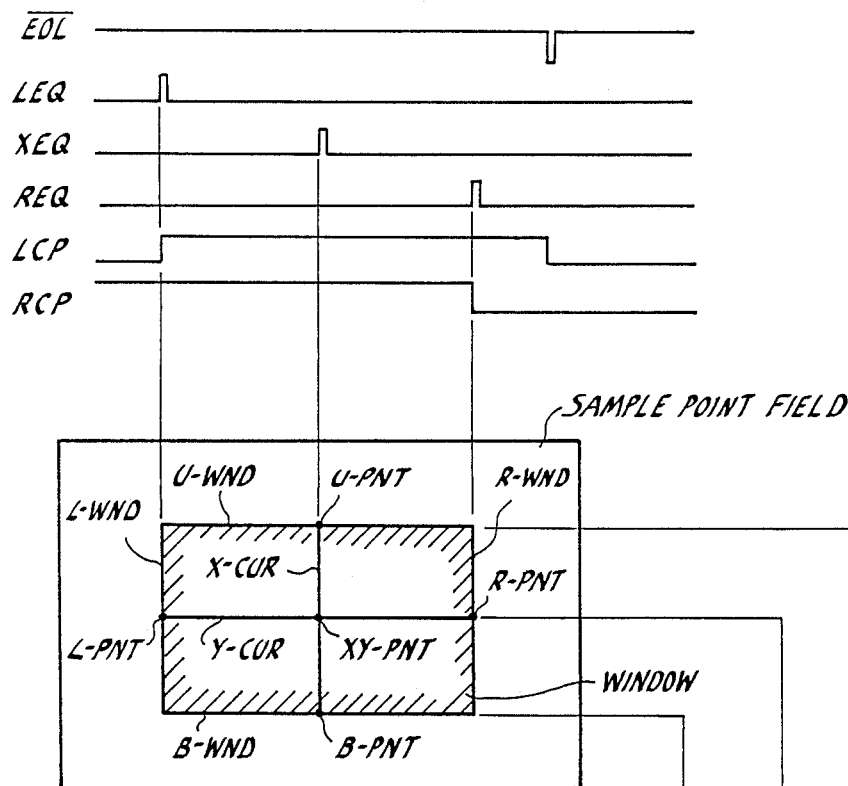
FIG. 4 is a timing diagram associated with the cursor generator.
Figure 4:
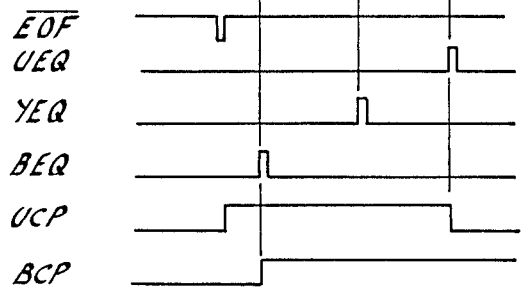

Memory 46 provides column-cursor pulses to terminals LEQ, REQ and XEQ and memory 47 provides row-cursor pulses to terminals YEQ, UEQ and BEQ. As seen in FIG. 4, pulses on terminal LEQ align themselves along the left side of a rectangle window to produce a left window cursor and pulses on terminal REQ align themselves along the right side of the window to produce a right window cursor. Likesrise, pulses on terminal XEQ align themselves along a column intermediate the left and right window cursors to generate an X cursor. Pulses on terminals UEQ and BEQ aling themselves along the upper and bottom sides of the window, respectively, to produce upper and bottom window cursors. Pulses on terminal YEQ appea along a row intermediate the upper and bottom window cursors to produce a Y cursor orthogonally intersecting the X cursor.

Cursor generator 28 further includes D flip-flops 54 and 55 with their D inputs coupled to a voltage source Vcc. Flip-flop 54 has a clock input connected to LEQ terminal and a clear input coupled to the carry output of horizontal counter 40 in order to generate a horizontal window pulse LCP on terminal LCP to define the left side of the window at the trailing edge thereof (FIG. 4). The clock input of flip-flop 55 is connected to REQ terminal and its clear input is connected to the carry output of counter 40. The signal on the output of flip-flop 55 which appears on terminal RCP is high during a period from the pulse to the time of occurrence of an REQ pulse to generate a second horizontal window pulse RCP whose trailiing edge defines the right side of the window. In a similar manner, D flip-flops 56 and 57 are provided having their clock inputs connected respectively to UEQ and BEQ terminals and their clear inputs coupled together to the end-of-frame carry output of vertical counter 41. The output of flip-flop 56, connected to terminal UCP, is high during the period between the times of occurrence of the end-of-frame pulse and the UEQ pulse to generate a vertical window pulse UCP whose trailing edge defines the upper side of the window and the output of flip-flop 57, conneted to terminal BCP, is high during the period defined by the BEQ pulse and a subsequent end-of-frame pulse to generate a second vertical window pulse BCP whose leading edge defines the bottom side of the window.

Figure 5:
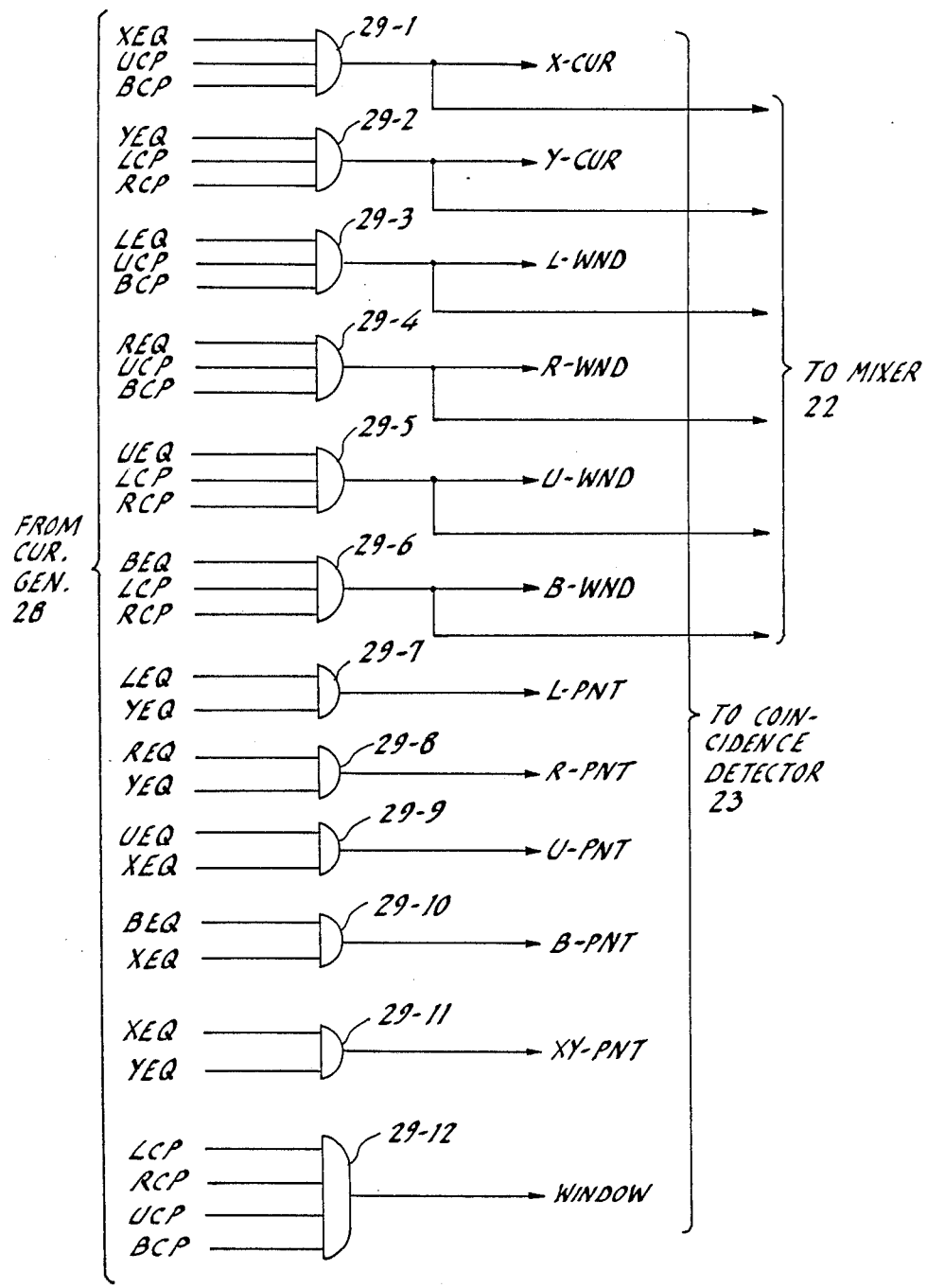
FIG. 5 is a block diagram of the AND gate logic of FIG. 2.

The output terminals of cursor generator 28 are connected to an AND gate logic 29, FIG. 5. This logic circuit comprises a plurality of AND gates 29-1 through 29-12 each providing an AND operation on a particular combination of the outputs of cursor generator 28. For example, vertical window pulses UCP and BCP are combined in AND gate 29-1 to pass an XEQ pulse to terminal X-CUR to develop the X cursor which determines the verticles dimensuin of the window. Similarly, horizontal window pulses LCP and RCP are combined in AND gate 29-2 to define the horizontal dimension of the window by passing YEQ pulses to terminal Y-CUR, producing the Y cursor. Pulses UCP and BCP are combined in AND gate 29-3 to pass LEQ pulses to terminal L-WND to generate the left window cursor. Likewise, pulses UCP and BCP are combined in AND gate 29-4 to pass REQ pulses to terminal R-WND to produce the right window cursor. Similarly, pulses UEQ, LCP and RCP are combined in AND gate 29-5 to to generate the upper window cursor at terminal U-WND and pulses BEQ, LCP and RCP are combined in AND gate 29-6 to provide pulses on terminal B-WND to generate the bottom window cursor. The pulse outputs on the above-mentioned terminals are applied to video mixer 22 to create a window and X and Y cursors on the video display 32 as shown in FIG. 4 and are also applied to a coincidence detector 23.

AND gate 29-7 provides AND operation on pulses LEQ and YEQ to produce a coincidence output on terminal L-PNT indicating the left-end point of the Y cursor and AND gate 29-8 provides AND operation on pulses REQ and YEQ to produce a coincidence output on terminal R-PNT that indicates the right-end point of the Y cursor. Similarly, pulses indicating the upper-end point U-PNT and the bottom-end point B-PNT of the X cursor are defined respectively by AND gates 29-9 and 29-10 by a combination of pulses UEQ and XEQ and a combination of pulses BEQ and XEQ. A pulse on terminal XY-PNT, which indicates the crosspoint of the X and Y cursors, is produced by AND gate 29-11 by a combination of pulses XEQ and YEQ. In addition, a window enable pulse on terminal WINDOW is generated by AND gate 29-12 which combines window-defining pulses LCP, RCP, UCP and BCP. All of these point-indicating terminals and the window-enable terminal are connected to coincidence detector 23.

Figure 6:
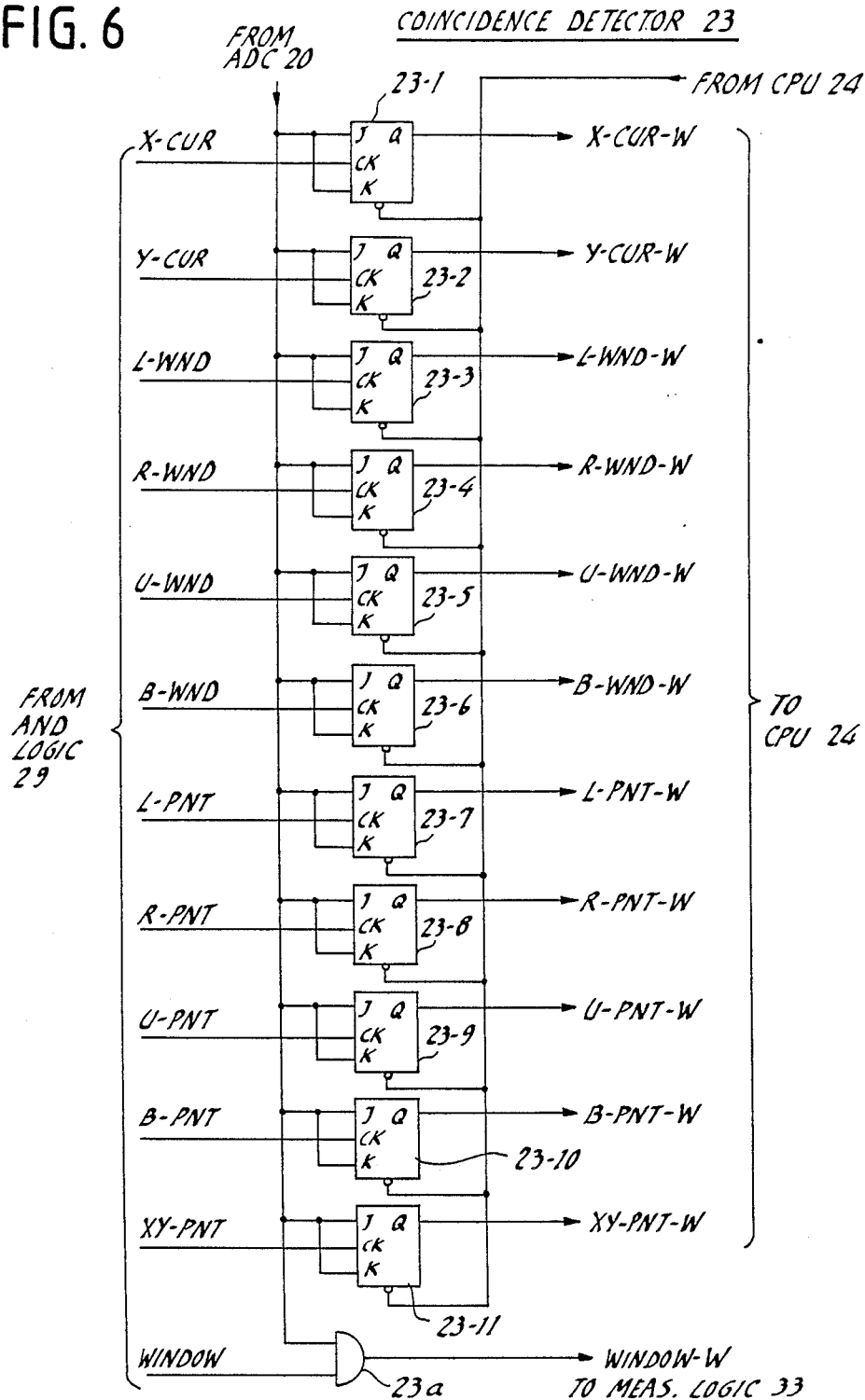
FIG. 6 is a block diagram of the coincidence detector of FIG. 2.

Coincidence detector 23 is essentially a latch circuit that provides a plurality of outputs indicating the presence of a coincidence of a data bit with each of the various points and sides of the window. As shown in FIG. 6, coincidence detector 23 comprises a plurality of J-k flip-flops 23-1 through 23-11 and an AND gate 23a. The J and K inputs of all the flip-flops are connected together to receive sample point data bits from AD converter 20 and the clock inputs are individually connected to receive cursor generating pulses and point-indicating pulses from AND gate logic 29. Upon receipt of a data bit in the presence of an X cursor pulse X-CUR, flip-flop 23-1 will generate an X-cursor-white (X-CUR-W) pulse which lasts until the flip-flop is cleared by a reset pulse supplied on conductor 23b from CPU 24. Similarly, a Y-cursor-white (Y-CUR-W) pulse, a left-window-edge-white (L-WND-W) pulse, a right-window-cursor-white (R-WND-W) pulse, an upper-window-edge-white (U-WND-W) pulse, a bottom-window-edge white B-WND-W) pulse, a left-point-white (L-PNT-W) pulse, a right-point-white (R-PNT-W) pulse, an upper-point-white (U-PNT-W) pulse, a bottom-point-white (B-PNT-W) pulse and an XY-point-white (XY-PNT-W) pulse are generated by flip-flops 23-2 through 23-11, respectively.

AND gate 23a combines sample point data bits from AD converter 20 with the window enable pulse to generate a plurality of pulses corresponding to all the sample points present on the surface of object 10. The outputs of all the J-K flip-flops are fed to CPU 24 to be interrogated at periodic intervals to detect the coincidence of a sample point data bit which corresponds to a point or edge of object 10 with any of the cursors and points. The output of AND gate 23a is also coupled to a measuring logic 33 shown at FIG. 7.

As will be understood as description proceeds, the automatic dimension analyzer of the invention provides measurement of small objects by the movement of X, Y and window cursors and measurement for larger objects by the movement of X-Y table relative to the cursors.

Measuring logic 33 is used for measuring distances and areas whenever the measurement involves a region which is smaller than the sample point field. An AND gat 33-1 is enabled by a frame detector 33-2 to pass the window-white pulses supplied from coincidence detector 23. This circuit includes AND gates 33-3 and 33-4 for measuring distances between opposite edges of object 10 in the X- and Y-directions and an AND gate 33-5 for measuring its illuminated surface area. AND gates 33-3 and 33-4 are selectively enabled by command signals X-MEAS and Y-MEAS from CPU 24 to pass the window-white pulses from AND gate 33-1 upon coincidence with X- or Y-cursor pulses from AND logic 29. AND gate 33-5 is enabled by an area command signal AREA from CPU 24 to pass all the sample point data bits on the object's surface. The outputs of AND gates 33-3, 33-4, 33-5 are fed through OR gate 33-6 to a binary counter 33-7 which provides a binary count to CPU 24.

Figure 8B:
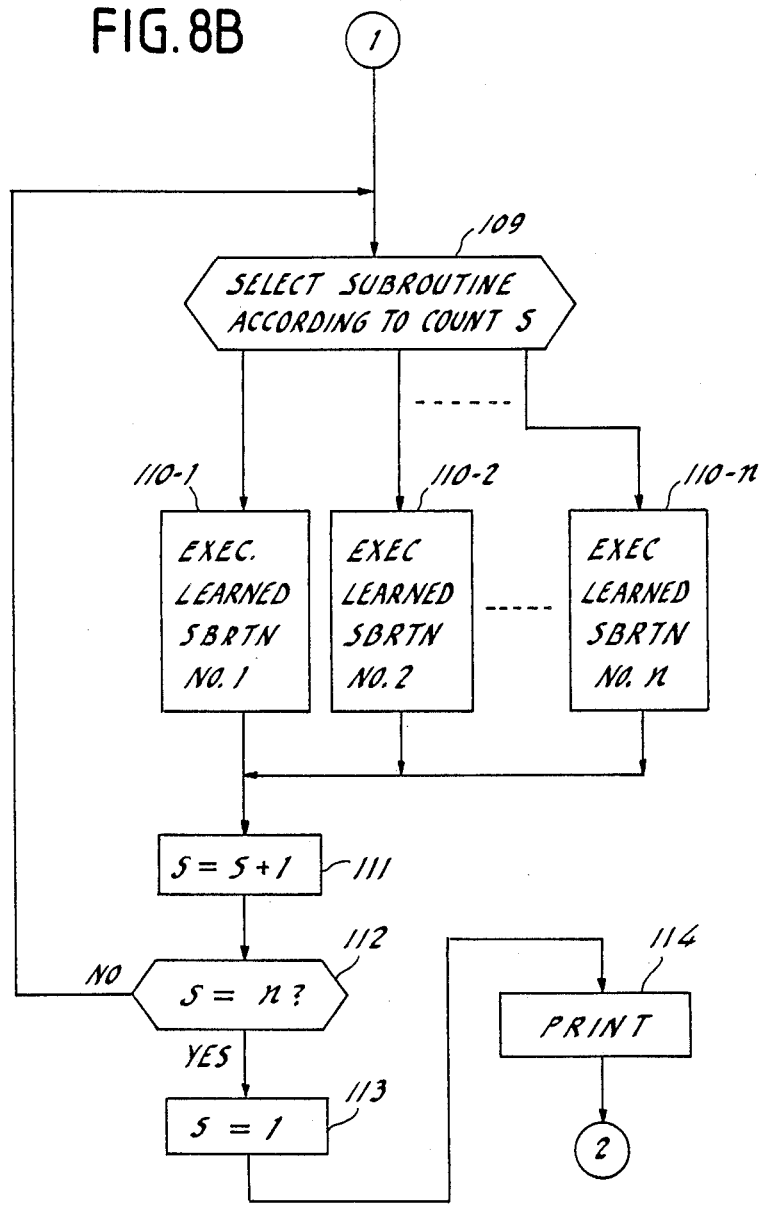

The central processing unit 24 is programmed to perform a plurality of subroutines or "commands" which are read into command RAM 35 during data entry, to "Learning" mode through a keyboard/mode select circuit 34 by an operator while viewing the display 32 with the aid of characters displayed. Flowcharts shown at FIGS. 8A and 8B describe a main routine preprogrammed into read-only memory 36 by which the commands are read into command RAM 35.

With power turned on, block 100 initializes the microprocessor to "Learning" mode in which various electronic circuit packages and X-Y table are properly conditioned for operation. "Display Menu" block 101 follows to display menu items on the video screen. Decision block 102 checks to see if the microprocessor is in data entry mode or in an "Execute" mode. During data entry mode, exit from block 102 goes to decision block 103 to check the count value S of a step counter against a count value "n" which indicates the total number of subroutines to be performed upon by CPU 24. Control goes to selection block 104 if the count value S is smaller than "n". In response to the most recent count value S, blocks 105-1, 105-2 through 105-n are sequentially executed. In each of these blocks, the instructions of a measurement subroutine are keyed into a specified memory area of the command RAM in a predetermined sequence by operator using the keyboard or a ten-key arrangement with the aid of display 32. When each subroutine is writen into command RAM 35, the step counter is incremented in block 106 and control returns to block 103. The process is repeated until the n-th subroutine is read into command RAM 35. With all the write operations complete, exit from block 103 goes to block 107 where the mode indicating flag is set to "Execute" mode and the step counter is reset to 1 at block 108 and control returns to block 101 and thence to block 102. Control now exits to selection block 109 to begin execution of the subroutines stored in RAM 35.

Execution blocks 110-1 through 110-n are sequentially selected by block 109 according to the count value S which is incremented in block 111 upon completion of each subroutine. When all the subroutines are executed, control exits from block 112 to block 113 to reset count S to 1. The microprocessor advances to block 114 which operates a printer 37 to provide a printout of the results of measurement generated in each of the executed subroutines.

Figure 14A:
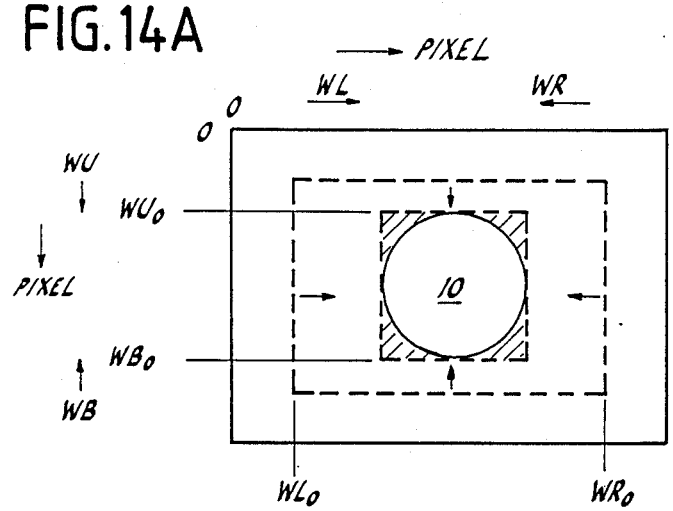
FIGS. 14A, 14B and 14C are illustrations associated with FIGS. 11, 12 and 13, respectively.
Figure 14B:
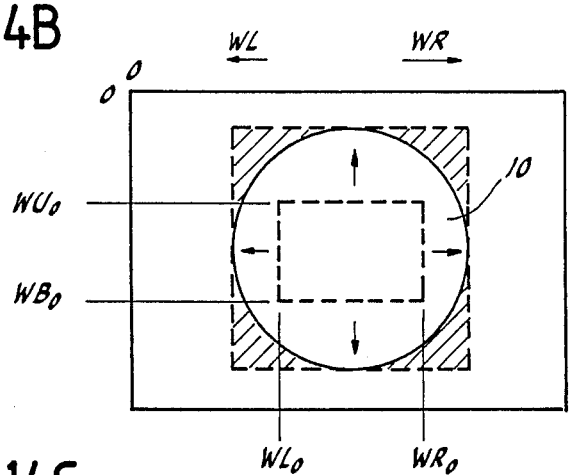
Figure 14C:
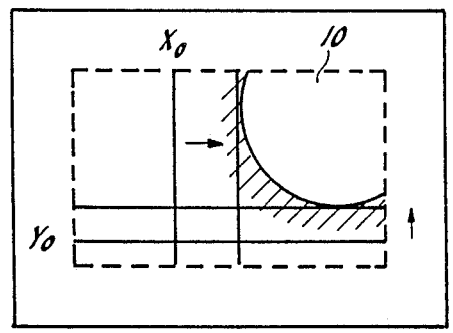
Figure 15:
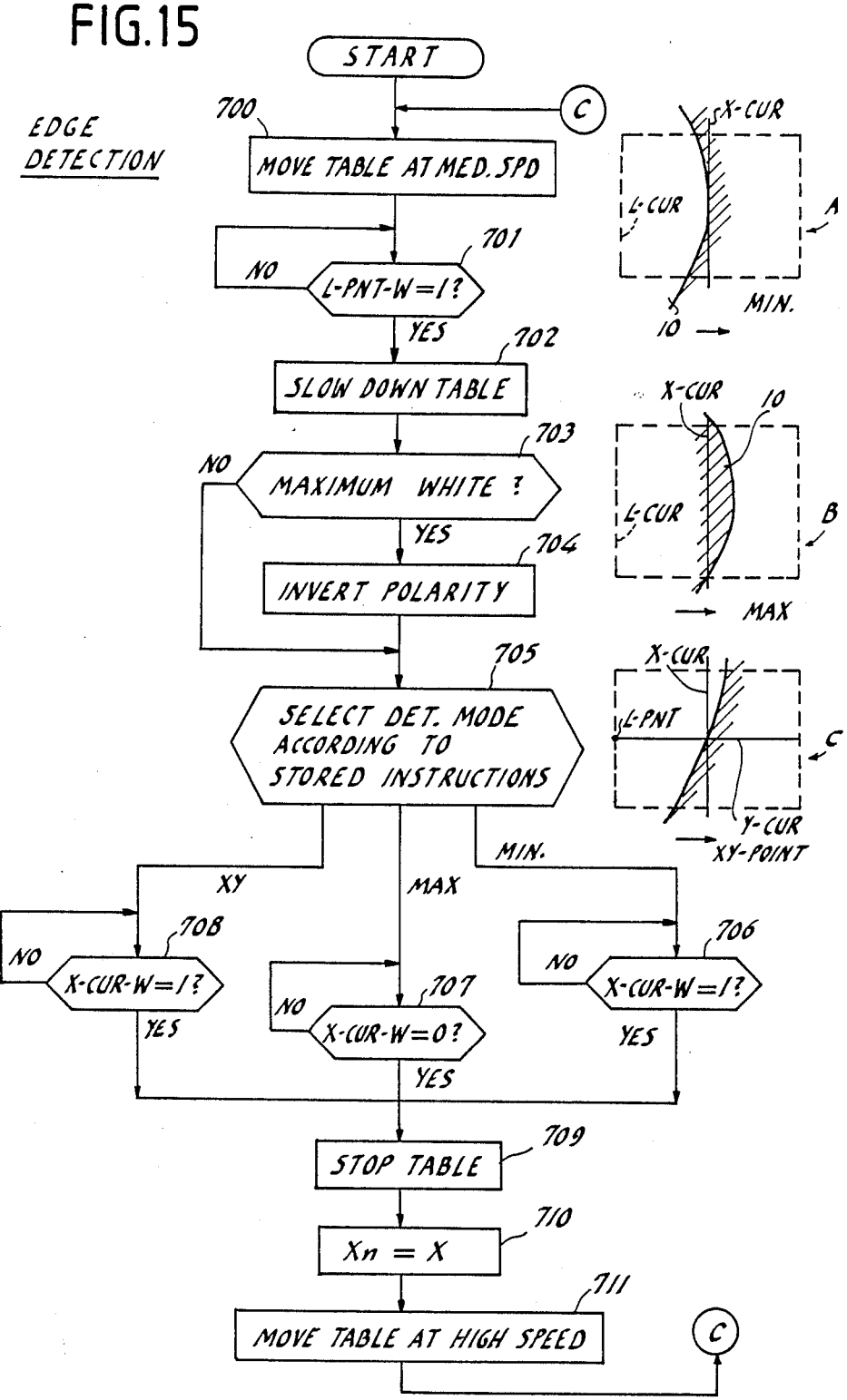
FIG. 15 is a flowchart describing a subroutine for detecting an edge of an object.
Figure 16:
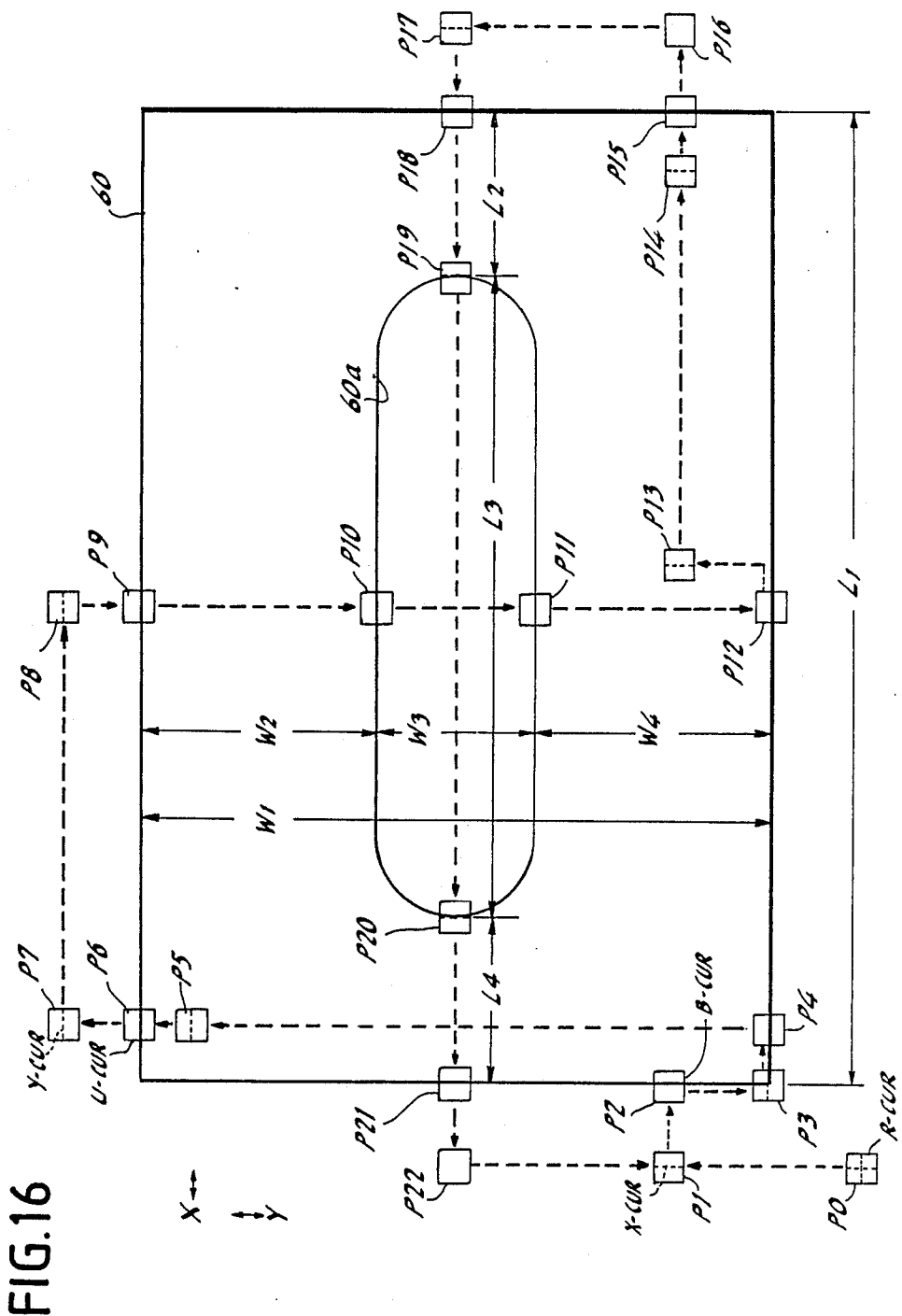
FIG. 16 is an illustration of a typical example showing the paths taken by the sample point field to detect various points of an object.
Figure 17A:
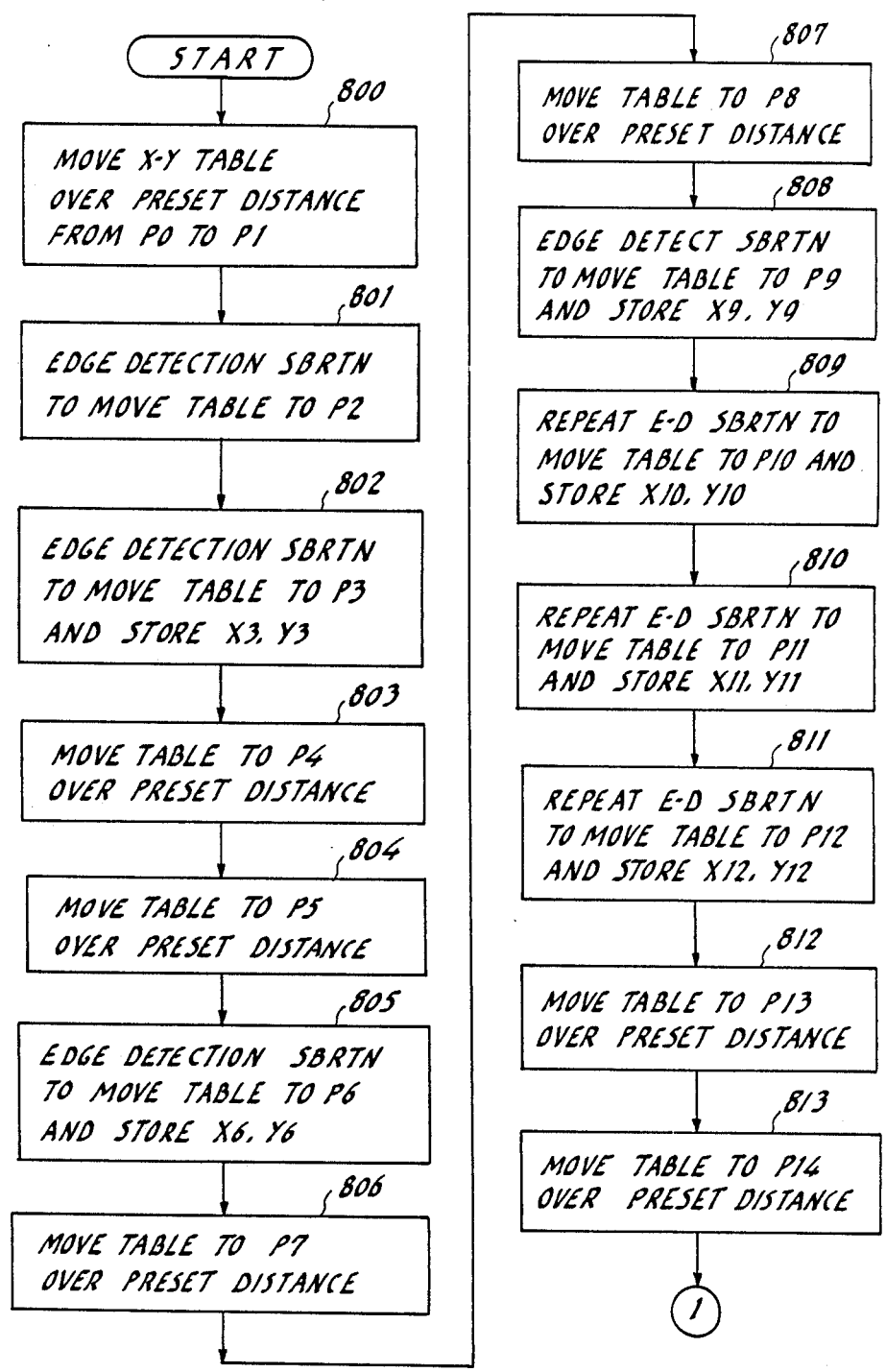
FIGS. 17A and 17B are flowcharts descriving a series of subroutines associated with FIG. 16.
Figure 17B:
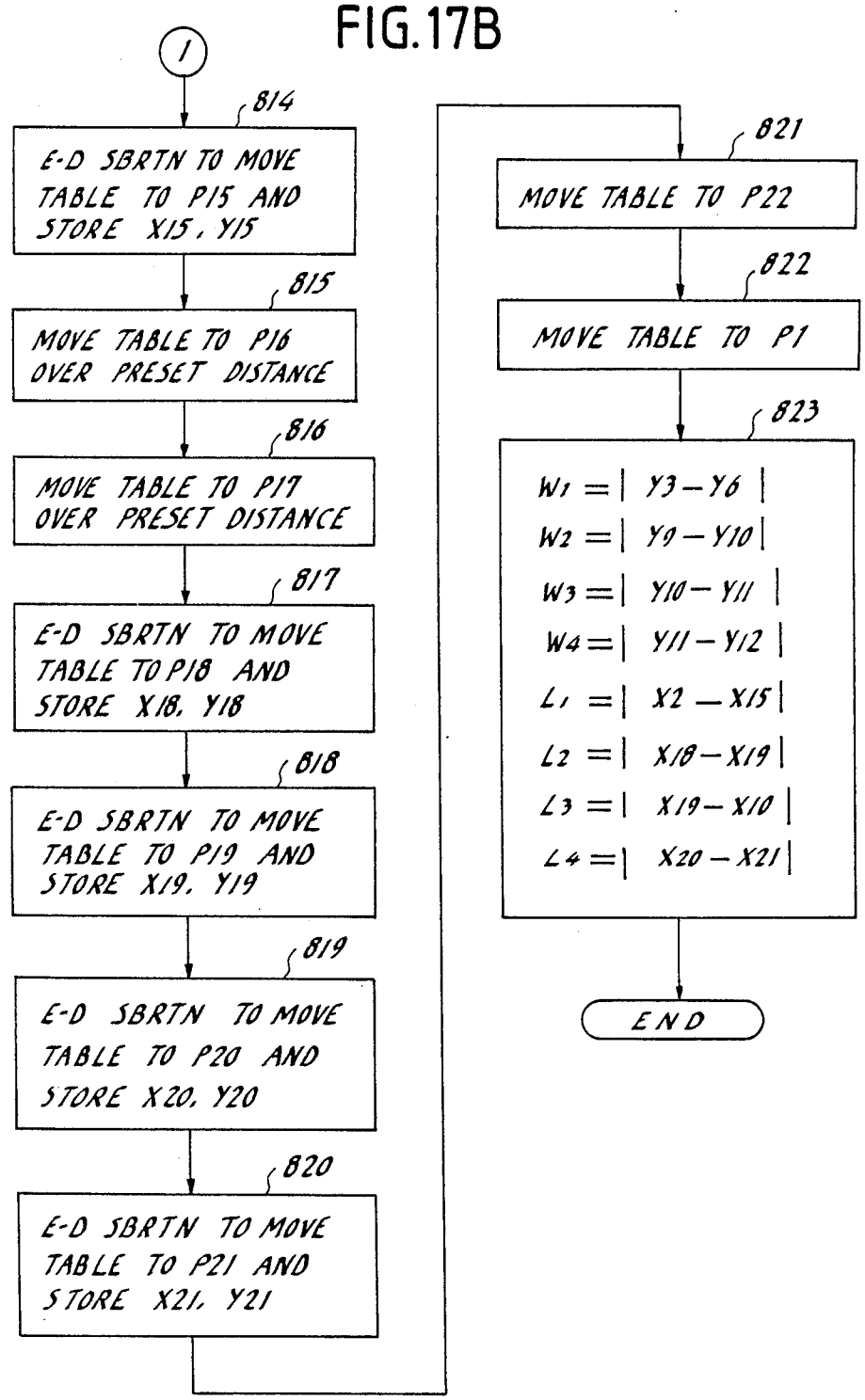
Figure 18:
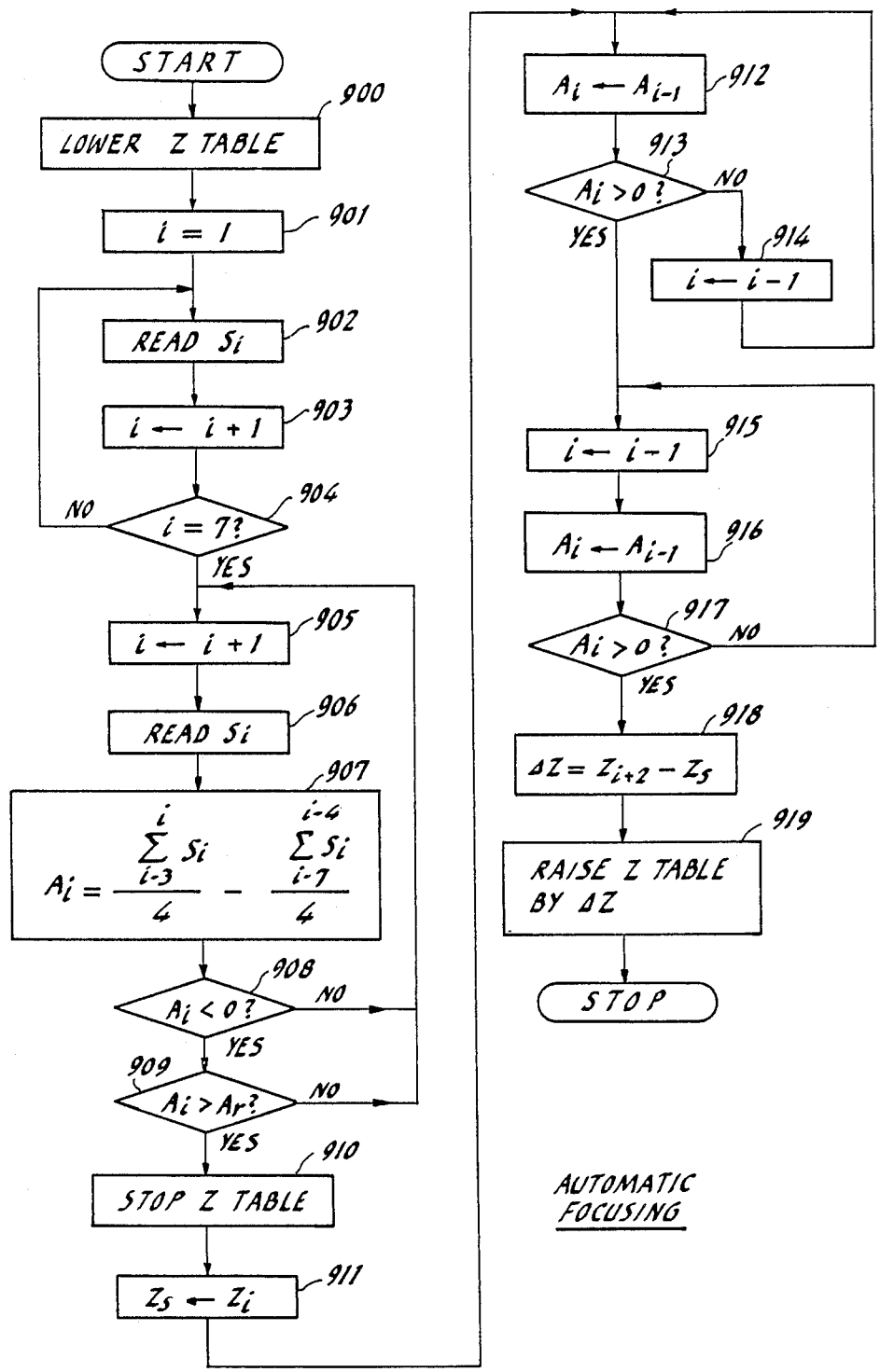
FIG. 18 is a flowchart describing a subroutine for automatic focusing operation.

Details of the subroutines which are advantageously employed in the present invention are illustrated in FIGS. 9 to 18. The subroutines can be divided into two types of measurement. The first type involves movement of the X, Y cursors and window cursors when measurement points of interest can be viewed within the sample field and the second type involves movement of the X-Y table when all the necessary measurement points cannot be viewed within the sample point field simultaneously. FIGS. 9 to 14 are concerned with the first type of subroutines and FIGS. 15 to 17 are concerned with the second type of subroutines. The subroutine shown at FIG. 18 provides automatic focusing operation which ca advantageously be used when the surfaces of objects being measured have varying height with respect to microscope 13.

Figure 7:
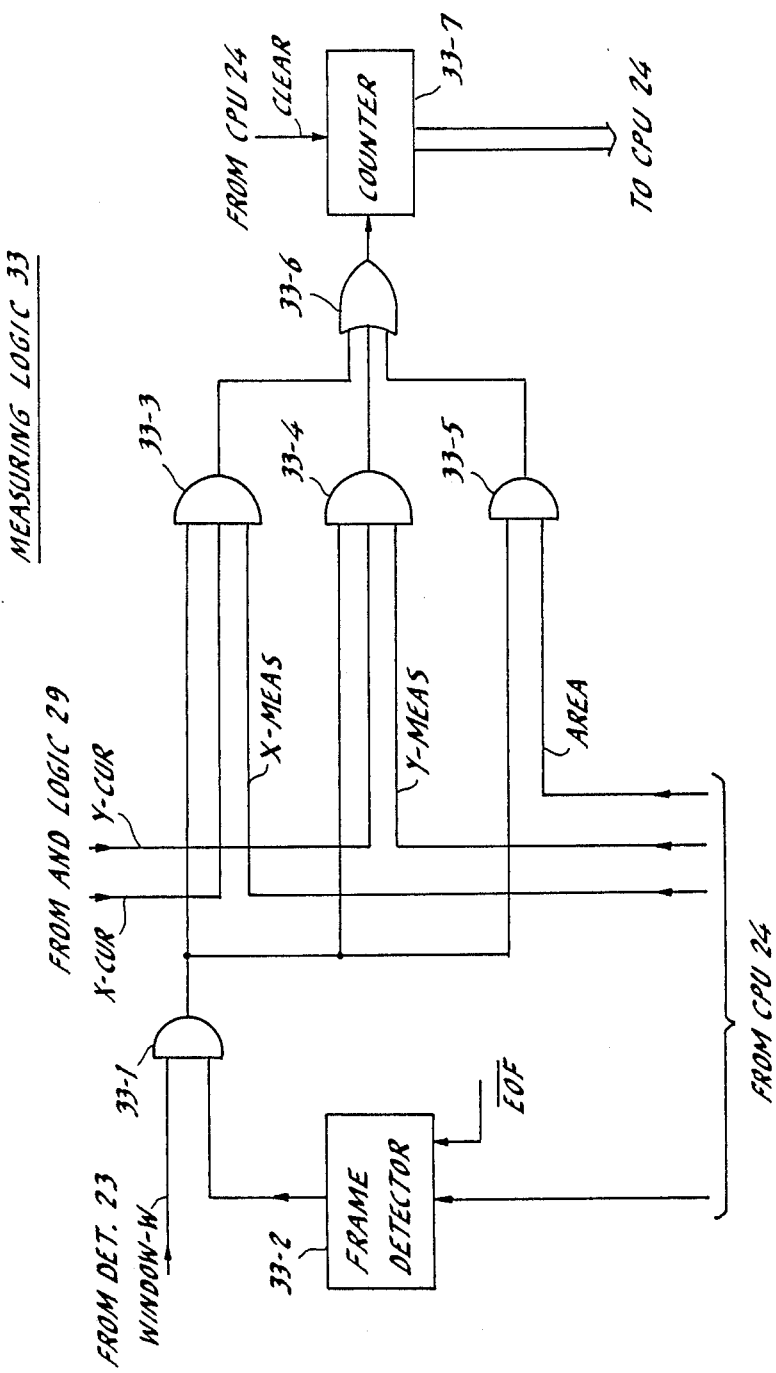
FIG. 7 is a block diagram of the measuring logic of FIG. 2.
Figure 9:
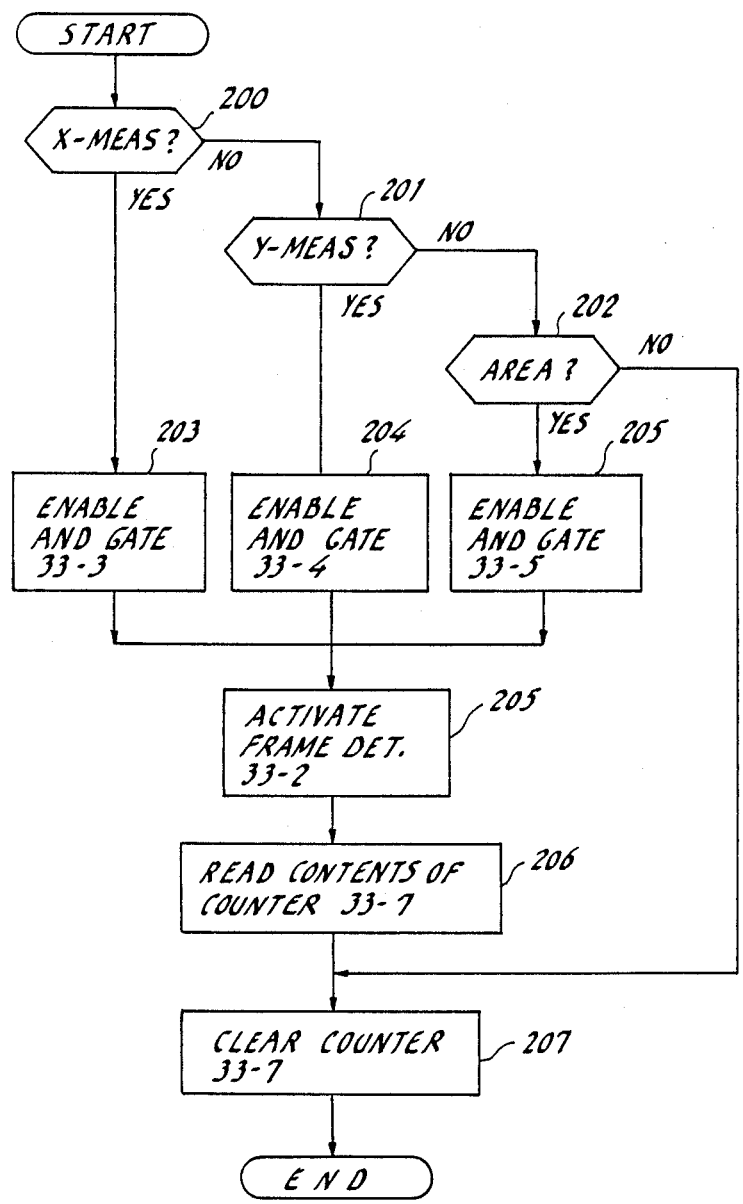
FIG. 9 is a flowchart describing a subroutine for measuring distances and areas.
Figure 10A:
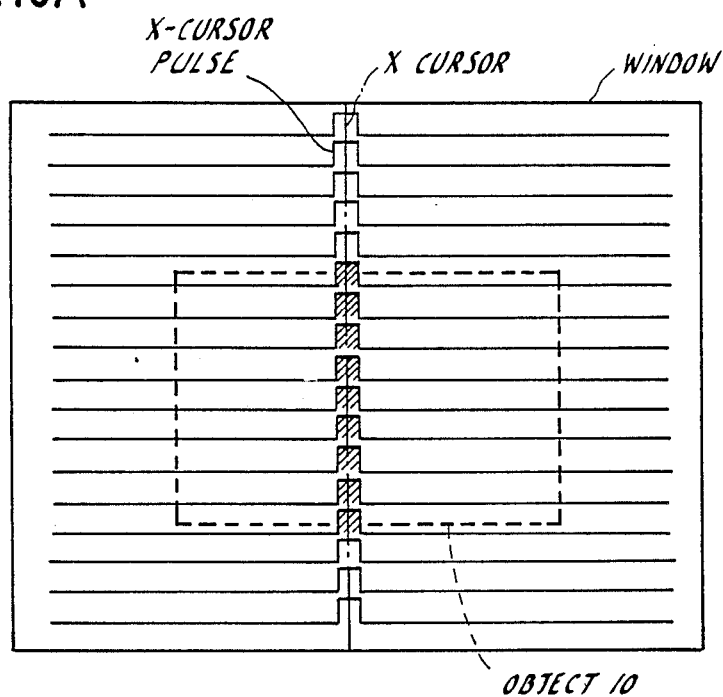
FIGS. 10A and 10B are illustrations associated with FIGS. 7 and 9.
Figure 10B:
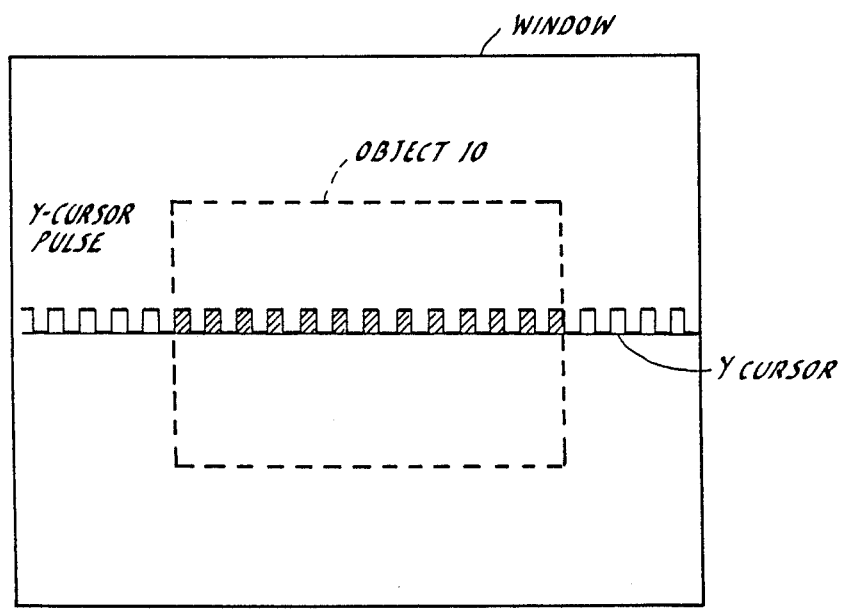

FIG. 9 shows a subroutine which is associated with FIG. 7 to provide measurement of distances between two points or edges of an object along the X and Y coordinate axes and the area of the object. Blocks 200, 201 and 202 check to see if the command requires measurement a distance along X-axis or Y-axis or it requires measurement of area. Control goes to an associated one of blocks 203, 204 and 205 depending on a decision taken by blocks 200, 201, 202 to enable one of AND gates 33-3, 33-4 and 33-5 of the measuring logic 33 (see FIG. 7). Block 205 activates frame detector 33-2 to provide an enable pulse to AND gate 33-1, thus supplying window-white pulses to counter 33-7. Counter 33-7 is incremented to a value corresponding to the number of white-level sample points and its count value is read in block 207. If the measurement is made with respect to the X-axis, the window-white pulses that coincide with X-cursor pulses are passed to the counter 33-7 as illustrated in FIG. 10A and the distance between the upper and lower edge of the object can be measured. As illustrated in FIG. 10A. If the measurement is concerned with the Y-axis, the window-white pulses that coincides with Y-cursor pulses are counted to give an indication of the distance between the left and right edges of the object as shown at FIG. 10B. When the measurement of an area is made, the window-white pulses that correspond to white-level sample points are passed to the counter to count up all the sample points on the illuminated surface of the object.

Figure 11:
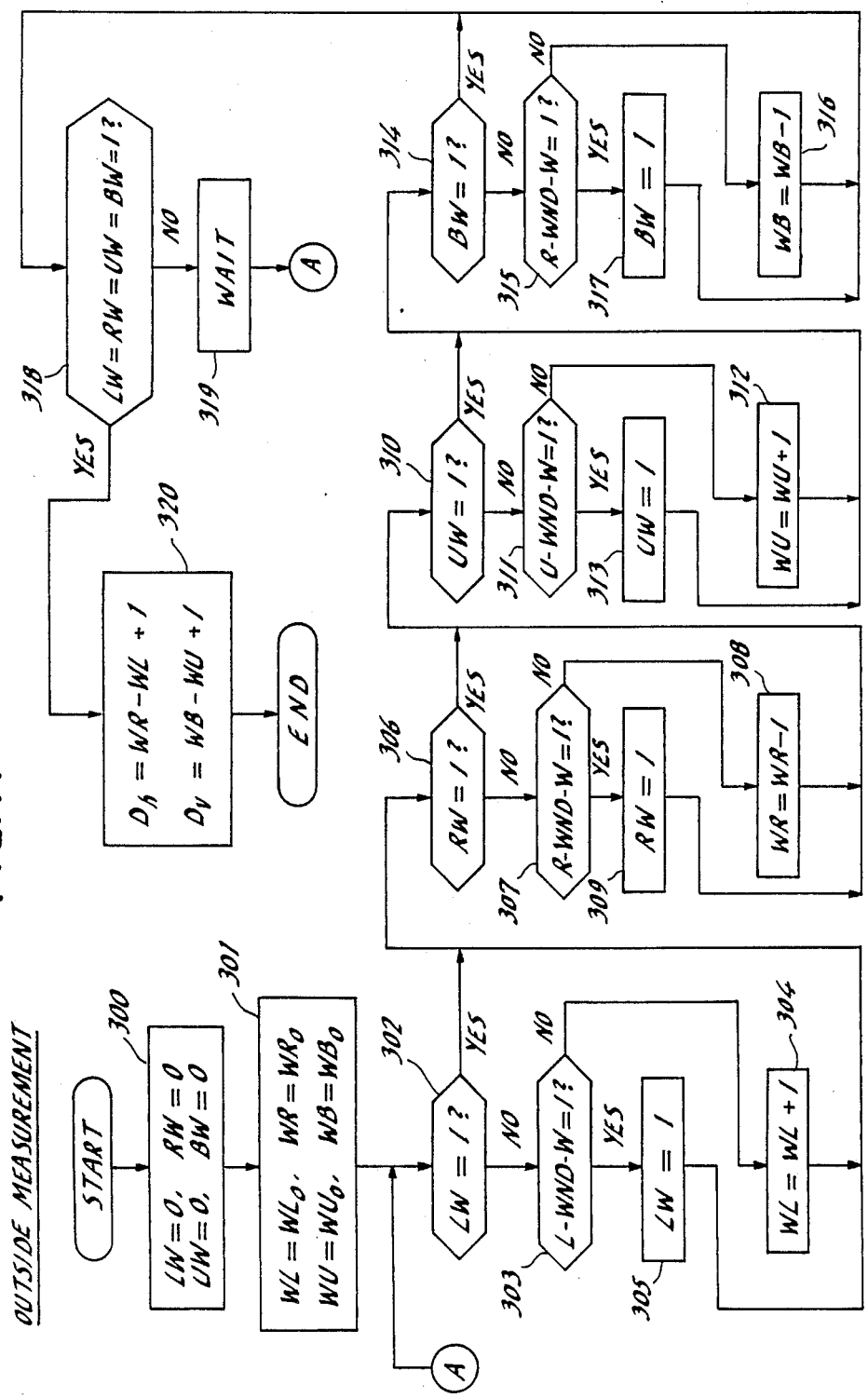
FIG. 11 is a flowchart describing a measurement subroutine according to one embodiment of the invention.

FIG. 11 is concerned with a measurement subroutine that determines the distance between opposite edges of an object according to the "outside measuring" method in which the object is located within the window and all the window cursors are moved inwardly toward the object. Block 300 initializes flags LW, RW, UW, BW each representing the detection of a white-level sample point on each of the window's left, right, upper and bottom sides, respectively. In block 301, window cursor variables WL, WR, WU and WB are preset to $WL_0$, $WR_0$, $WU_0$ and $WB_0$ which indicate the initial positions of the left, right, upper and bottom sides of the window, respectively, and which are located outside the object as illustrated in FIG. 14A. Microprocessor 24 provides column and row address codes corresponding to the initial positions of the window cursors on buses 48 and 49 through selector 42, FIG. 3, to column-and row-cursor memories 46 and 47.

Control goes to block 302 to check to see if flag LW has been set up and, if not, it exits to block 303 to check for the presence of a binary 1 at the L-WND-W terminal of coincidence detector 23 (see FIG. 6). This indicates the occurrence of a coincidence between the left window cursor and a sample point located one pixel inside of the true left edge of object 10. Block 304 increments the left window cursor address variable WL by one to move the left window cursor by one pixel to the right. Control advances to decision block 306 which tests for the presence of a flag state RW=1. If the right window cursor flag RW is not set up, indicating that the right window cursor is not yet coincident with the right edge of the object 10, control goes to decision block 307 to check for the presence of a binary 1 at the R-WND-W terminal of coincidence detector 23. If binary 1 is not present at that terminal, block 308 follows to decrement the right window cursor address variable WR by one to move the right window cursor one pixel to the left. Similar operations are performed on blocks 310, 311 and 312. Upper window cursor variable is incremented by one to move the upper window cursor one pixel downward. Execution of blocks 314, 315 and 316 causes bottom row address variable WB to be decremented by one to move the bottom window cursor one pixel upward. Control now advances to block 318 to check to see if all the flags are set equal to 1. Block 319 introduces a frame interval delay to allow the sample point data to be updated for the next frame scan. Control returns to block 302 to repeat the above process. Therefore, all the window cursors are successively moved inwardly by incremental address variables WL, WU and decremental address variables WR, WB until binary 1 appears at terminals L-WND-W, R-WND-W, U-WND-W, B-WND-W of coincidence coincidence detector 23. Flags LW, RW, UW and BW are now set to 1 in blocks 305, 309, 313 and 317, respectively. Control exits from block 318 to block 320, which measures the dimension in the horizontal direction Dh between the left and right edges of object 10 by taking the difference between WR and WL. Since this computed difference is one pixel smaller than the true value, a unity value is added to the difference. Similar computation is performed on equation WB−WU+1 to determine the vertical distance Dv between the upper and lower edges of the object.

Figure 12:
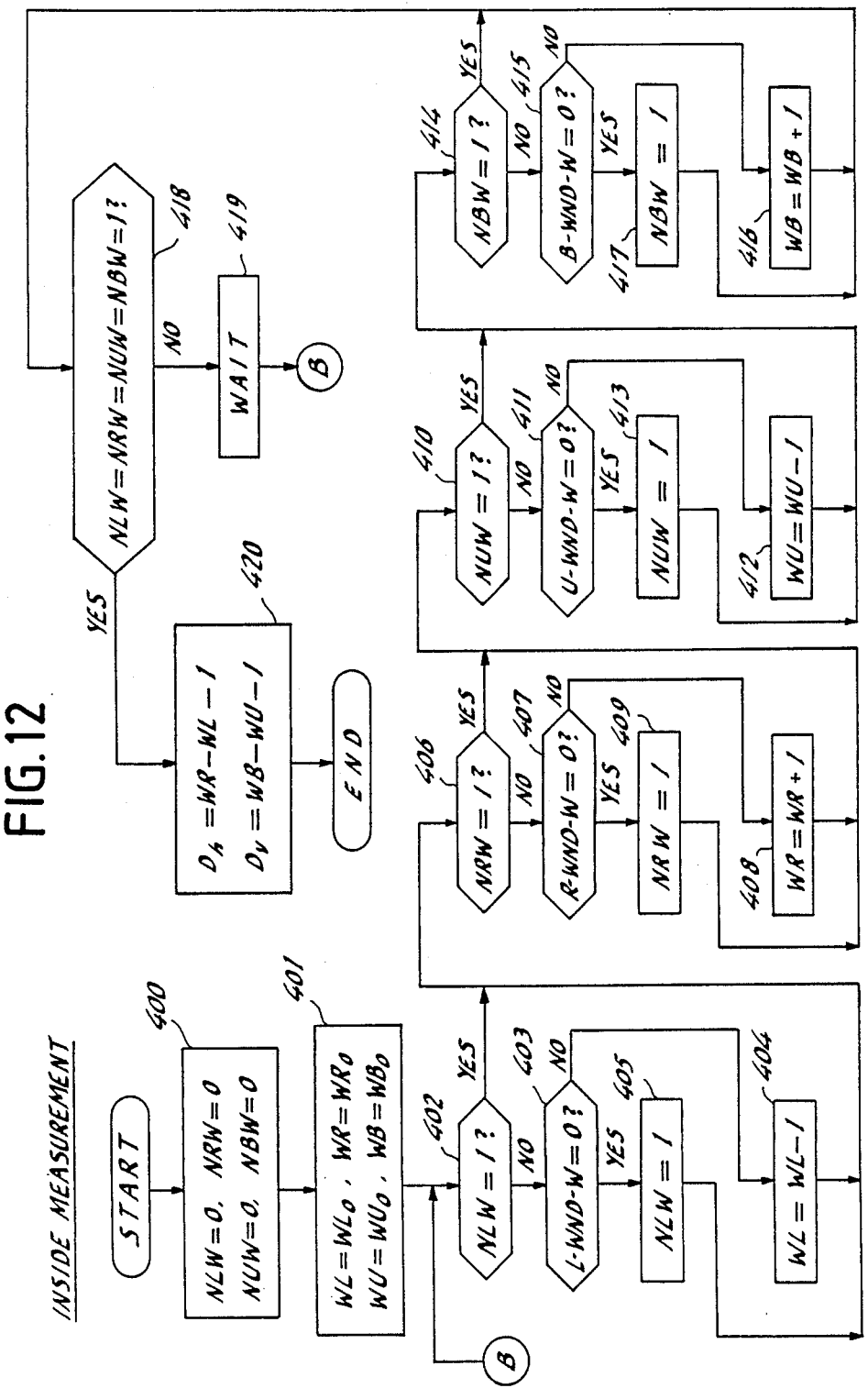
FIG. 12 is a flowchart describing a measurement subroutine according to another embodiment of the invention.

FIG. 12 is concerned with a second measurement subroutine that determines the distance between opposite edges of an object according to the "inside measuring" method in which the window cursor are moved outward from predetermined positions located inside the object as seen in FIG. 14B. Block 400 initializes flags NLW, NRW, NUW, NBW each representing the detection of a black-level sample point on each of the left, right, upper and bottom window cursors, respectively. In block 401, cursor address variables WL, WR, WU and WB are preset to the initial values $WL_0$, $WR_0$, $WU_0$ and $WB_0$ which are located within the area of the object defined in the sample point field.

Control goes to block 402 to check to see if flag NLW is not set to 1 and if not, it exits to block 303 to check for the presence of a binary 0 at the L-WND-W terminal of coincidence detector 23 which indicates the occurrence of a coincidence between the left window cursor and a black-level sample point on pixel outside of the true left edge of object 10. Block 404 increments the variable NWL by one to move the left window cursor one pixel to the right. Control advances to decision block 406 which tests for the presence of a flag state NRW=1. If NRW flag is not set to 1 indicating that the right window cursor is not yet coincident with the right edge of the object 10, control goes to decision block 407 to check for the presence of a binary 0 at the R-WND-W terminal of coincidence detector 23. If binary 0 is not present at that terminal, block 408 follows to decrement the variable WR by one to move the right window cursor one pixel to the left. Similar operations are performed in blocks 410, 411 and 412 to move the upper window cursor one pixel downward and in blocks 414, 415 and 416 to move the bottom window cursor one pixel upward. Control now advances to block 418 to check to see if all the flags are set equal to 1. Block 419 introduces a frame interval delay to allow all the sample point data bits to be updated for the next frame scan. Control returns to block 402 to repeat the process. Therefore, all the window cursors are successively moved inward until binary 0 appears at terminals L-WND-W, R-WND-W, U-WND-W, B-WND-W by incremental variables WR, WB and decremental variables WL, WU. Flags NLW, NRW, NUW and NBW are now set equal to 1 in blocks 405, 409, 413 and 417, respectively. Control exits from block 418 to block 420 to measure the dimension Dh by taking the difference between WR and WL. Since this computed difference is one pixel larger than the true value, a unity value is subtracted therefrom. Similar computation is performed on equation WB-WU-1 to determine Dv.

Figure 13:
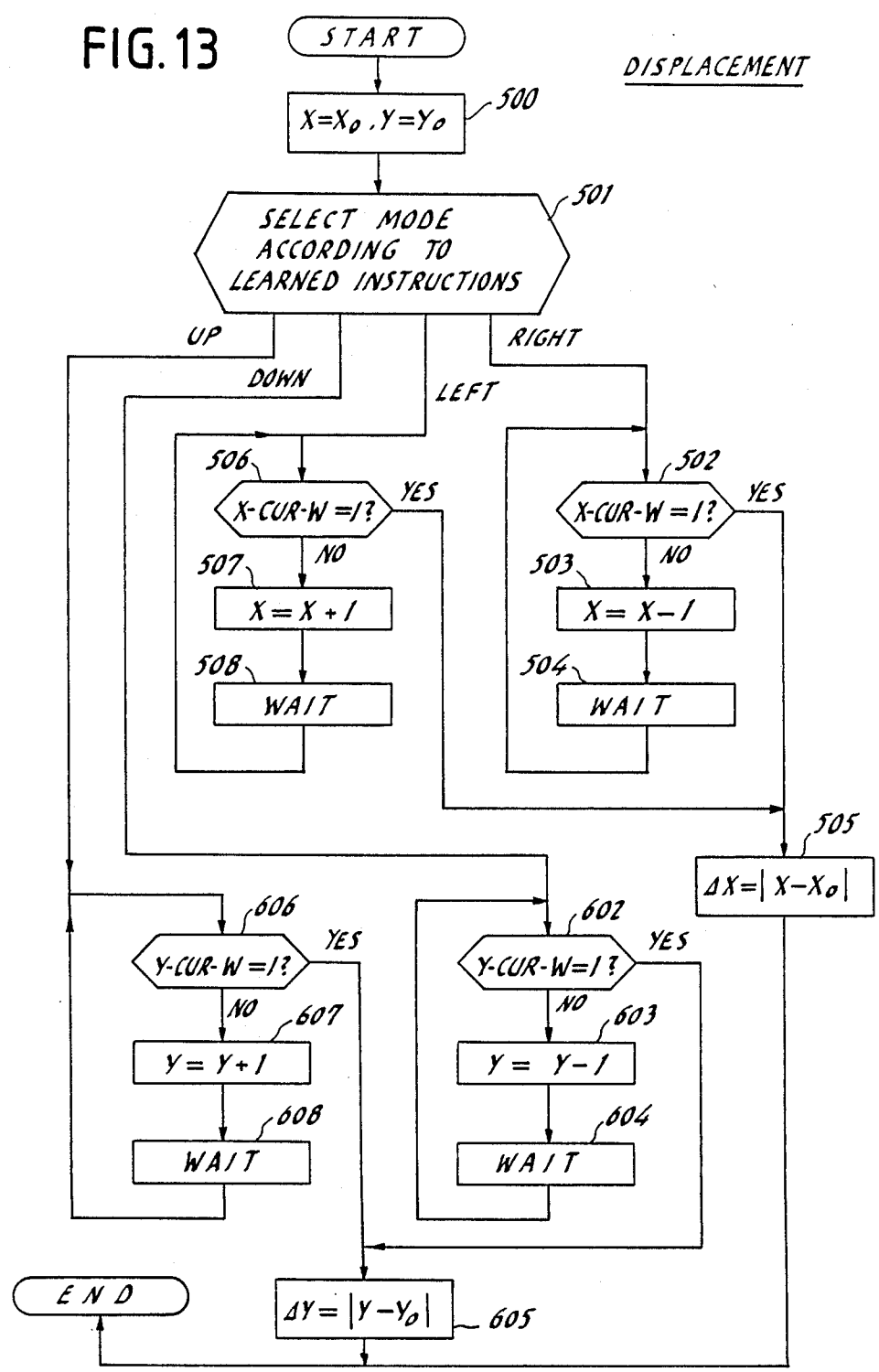
FIG. 13 is a flowchart descring a subroutine involving the measurement of displacement.

FIG. 13 is concerned with a third measurement subroutine that determines the displacement of an edge of the object with respect to the X or Y cursor by moving it from a predetermined position to that edge (FIG. 14C). Block 500 initializes X and Y cursor address variables X and Y to initial values $X_0$ and $Y_0$, respectively. Selection block 501 follows to select the instruction stored in the RAM 35 indicating the direction in which the X or Y cursor is to be moved in the sample point field. Assume that the stored instruction contains a "move to right" command, control exits to block 502 to check for the presence of binary 1 on terminal X-CUR-W of coincidence detector 23. Initial exit from block 502 is to block 503 which decrements the address variable X by one to shift the X cursor one pixel to the right. After introduction of a frame interval delay, control returns to block 502 to repeat the process. X cursor is thus shifted successively to the right and finally coincides with an edge of the object 10. When this occurs, exit from block 502 is to block 505, which derives a displacement $\Delta X$ by taking the difference between the most recent value X and the initial value $X_0$. If the instruction involves a "move to left" command, blocks 506, 507, 508 will be executed, whereby the address variable X is incremented, resulting in the movement of X cursor to the left until coincidence is detected in block 506 which is followed by computation block 505.

Likewise, displacements in the column direction can be derived in block 605 by moving the Y cursor downward through the execution of blocks 602, 603, 604 or moving it upward by executing blocks 606, 607, 608.

The subroutines described above are useful for measuring small objects when measurement points of interest can be located within the sample point field. These subroutines are serially combined to form a main routine, which is stored in the command RAM 35. Such main routines may include table-shift subroutines which cause the table driver 26 to move X-Y table 11 over a preset distance so that points of measurement can be shifted from one location to the next as the execution of each subroutine is complete and finally brought to the original position when control exits from the main routine.

If the measurement points are located outside the sample point field, the X-Y table driver and position encoder 26 are operated under control of microprocessor 24 to shift the measurement point in succession to the next while holding the window and X, Y cursors in fixed positions. This allows sequential detection of opposite edges of an object and hence the determination of the distance between them.

FIG. 15 illustrates an edge detection subroutine involving the movement of X-Y table 11 using a fixed X cursor for the detection of the edges of an object moving to the right.

Before describing this subroutine, it is appropriate to describe the methods of edge detection which are advantageously incorporated with the automatic dimension analyzer of the present invention. These methods are roughly sketched at A, B and C in FIG. 15. The first method, shown at A, determines the occurrence of a coincidence between an edge of object 10 and the X cursor when the number of white-level sample points (which necessarily exist on the surface of object 10) is at a minimum on the X cursor. The invention accomplishes this by detecting the instant the X-CUR-W terminal of coincidence detector 23 switches to binary 1 and detecting the position of the X-Y table 11 at the same time. This enables detection of a foremost edge of an object.

The second method, shown at B, detects the edge of an object by inverting the polarity of the sample point field so that white level sample points turns to black and the background area turns to white as the object approaches the X cursor. Coincidence occurs when the terminal X-CUR-W switches to binary 0. This occurs when the number of black level sample points is at a maximum along the X cursor. The measurement taken in this way gives a minimum distance between the innermost points of opposite edges. The third method, shown at C, involves the use of the X and Y cursors, the crosspoint of which is used for edge detection. In this instance, the XY-PNT terminal is monitored to detect when the binary state of this terminal switches to 1.

Since the edges of a machined workpiece are not straight on the order of micrometers, these methods provide useful measurement approaches to the analysis of objects having different shapes and sizes.

The edge detection subroutine begins at block 700 which causes X-Y driver 26 to move the table at a medium speed. Block 701 monitors the L-PNT-W terminal of concidence detector 23. This block is repeated until L-PNT-W terminal switches to binary 1. This occurs when the left window cursor L-CUR has encountered an approaching edge of the object. Control exits to block 702 to slow down the X-Y table. The reduction of table speed allows the CPU to give an accurate indication of table position at the instant the X cursor encounters the approaching object. Block 703 determines whether the learned instructions require the second method just described and if so, block 704 is approached to invert the polarity of the sample point field. This is accomplished by applying a signal on conductor 21, FIG. 1, to polarity inverter 17 to cause it to invert the polarity of sample point data bits. If the stored instruction data involves the use of first or third method, block 704 is skipped. Block 705 provides selection of a mode according to the learned data.

Block 706 will be executed if the first method is selected. This step involves the detection of a binary 1 at the X-CUR-W terminal. When the outermost point of the approaching object encounters the X cursor, shown at A, control exits to block 709 to stop the X-Y table and register the position data obtained at this instant by the X-Y position encoder 25 into a memory location (block 710). The position data indicates the distance of the encountered edge along the X axis with respect to a reference position.

Block 707 is executed when the second method is selected. In this step, the X-CUR-W terminal is monitored to detect when it switches to binary 0, which occurs when the X cursor encounters the innermost point of the edge.

Selection of the third method involves block 708 which monitors the XY-PNT-W terminal to detect when it switches to binary 1. This XY-point detection permits detection to be made at any point along the X cursor by appropriately locating the Y cursor position.

Block 712 may be included to move the XY table at a high speed over a preset distance so that the opposite edge of object 10 is rapidly moved to a point adjacent the left window cursor. This "fast feed" operation minimizes the measurement time and is particularly advantageous when an array of workpieces is to be measured in succession. A further advantage of this fast feed operation prevents the cursors from detecting faults which may present themselves as false sample points on the surface of the workpiece.

A plurality of such edge detection subroutines can be serially combined to continuously detect the positions of opposite edges of an object. The first and second methods can be advantageously combined to effect the detection of an outermost point at one edge of the object according to the first method and to effect the detection of a second outermost point on the opposite edge according to the second method. Innermost detection can be performed at opposite edges in sequence by executing subroutines of the second method.

FIG. 16 illustrates a practical example involving a series of edge detection subroutines. A workpiece 60 of a rectangular shape with an elongated opening 60a is placed on the XY table. Each of the small squares shown in FIG. 16 represents the sample point field as located at each of various measurement points beginning with the original point P0 to the final point P22 and back to the original position P0. The measurement involves determination of lengths L1, L2, L3 and L4 and widths W1, W2, W3 and W4 as illustrated. This is accomplished by a series of subroutines shown in FIGS. 17A and 17B. Block 800 is a fast feed subroutine which moves the XY table downward in the Y direction at high speed over a preset distance from the original position P0 to a start position P1. Block 801 is an edge detection subroutine which starts at position P1 moving the table to the left in the X direction at medium speed. The speed of the table is then reduced to low value as the left edge of workpiece 60 coincides with the right window cursor R-CUR and the table is stopped at position P2 as it encounters the X cursor which is detected according to the first or second method described above and position data X2 is read from X-Y position encoder 26 and stored into a memory. Block 802 moves the table at medium speed in the Y direction until the lower edge of workpiece 60 encounters the bottom window cursor B-CUR, whereupon the table speed is reduced to low value until it encounters the Y cursor at the lower-left corner position P3 and position data X3 and Y3 at position P3 are read from X-Y encoder 26 and stored into memory. Control advances to block 803 where the table is moved to the left so that the right window cursor is stopped at a point inwardly of the left edge in order to prevent it from entering the sample point field as the table is subsequently moved at in fast feed mode in the Y direction from position P4 to position P5 (block 804). Edge detection subroutine is executed in block 805, which moves the table at medium speed from position P5 until the upper edge of workpiece 60 encounters the upper window cursor U-CUR, then at low speed until it encounters the Y cursor whereupon position data X6, Y6 are registered. Block 806 moves the table in fast feed mode to position P7 in order to keep the upper edge from entering the sample point field as the table is moved subsequently in fast feed mode to a point P8 halfway between right and left edges (block 807). Block 808 moves the table in the Y direction to permit detection of the upper edge at position P9 where position data X9, Y9 are registered. The same subroutine is repeated in blocks 809, 810 and 811 as the table is moved from P9 to P12 stopping at positions P10 and P11 detecting the upper and lower edges of opening 60a and detecting the lower edge of workpiece 60 at position P12. Position data (X10, Y10), (X11, Y11) and (X12, Y12) are sequentially registered at positions P10, P11 and P12, respectively. The table is sequentially moved over preset distances from position P12 to position P13 located inwardly from the lower edge of the workpiece and thence to position P14 located inwardly from the right edge of the workpiece (blocks 812, 814). Right edge detection is performed by block 814 which moves the table from P14 to P15 where position data X15, Y15 are registered. Fast feed operation iseffected beginning with position P15 to P16 and thence to P17 (blocks 815, 816). The table is then moved at medium speed in the X direction for right edge detection at position P18 to obtain position data X18, Y18 and continued in the same direction to detect a outermost point on the right edge of opening 60a. Since the opening 60a presents black-level sample points, the edge detection subroutine for position P19 incorporates the second method in which the sample point field is inverted in polarity. Alternatively, the third method may be employed for the edge detection at point P19. The same subroutine as performed at position P19 is repeated by block 819 as the table is moved at medium speed to position P20 to detect the left edge of opening 60a and make record of position data X20, Y20. Block 820 performs edge detection incorporating the first method to detect a left edge position P21, registering position data X21, Y21. The table is moved over preset distance to P22 and thence to the starting position P1 (blocks 821, 822).

Finally, in block 823 dimensions $W1=|Y3-Y6|$, $W2=|Y9-Y10|$, $W3=|Y10-Y11|$, $W4=|Y11-Y12|$, $L1=|X2-X15|$, $L2=|X-X19|$, $L3=|X19-X20|$, and $L4=|X20-X21|$ are derived in an arithmetic logic unit 38.

Since the surface contour of objects under examination tends to vary from place to place it is beneficial to control the vertical position of the microscope 13 at a constant distance from the examined surface to keep a sharp optical image on the area imager 14 while the measurement point is moved in succession.

FIG. 18 shows a subroutine for effecting the automatic focusing operation, which begins with block 900. The Z-table driver 27 is controlled to move the Z table 12 downward and a variable "i" is set equal to 1 (block 901). Data bits located within a predetermined area of the sample point field are sampled and counted to give a count value $S_i$ at variable "i", which is stored in memory (block 902). Since the number of data bit count is maximum when the optical image of the object being measured is sharply focused on area imager 14 and decreases with distance from the focal point, the count value $S_i$ is an excellent indication of the focusing condition.

Block 903 increments the variable "i", requiring a decision step in block 904 which checks to see if the variable "i" is 7. Blocks 902 and 903 are repeated until the Z table has moved downward to a position which is seven steps lower than the initial position. Variable "i" is then incremented (block 905) and data bit coun $S_i$ is read into memory (block 906). In block 907, a first mean value is derived from data bit counts at the initial four vertical steps (i=0 to i=3) and a second mean value is derived from those at the later four vertical steps (i=4 to i=7). The difference $A_i$ is taken between the first and second mean values. This difference value indicates the gradient of a curve which the data bit count would adopt as the Z table is lowered through consecutive steps. Block 908 follows to check to see if the value $A_i$ is negative. If negative, the gradient indicates that the data bit count is on the decrease and the Z table is moving in a direction away from the focal point and if positive the gradient indicates that the data bit count is on the increase and the Z table is moving toward the focal point. Blocks 905, 906 and 907 are repeated until the Z table has crossed the focal point. Block 909 tests to see if the difference $A_i$ has exceeded a threshold value $A_r$. Blocks 905, 906, 907 and 908 are repeated until the threshold value is reached and the Z table is stopped (block 910). A vertical position variable $Z_i$ is stored into memory as $Z_s$ indicating the stop position (block 911). Block 912 reads the difference value $A_{i-1}$ derived at one step earlier position, requiring block 913 to check to see if the previous data bit count is negative. If positive, variable "i" is decremented in block 914 to read the difference value at one step higher position in block 912. Blocks 912, 913 and 914 are repeated until the difference having a positive sign appears. This indicates that the corresponding vertical position is one step higher than the focal point. The process is repeated once again by blocks 915, 916 and 917 to read out a second positive difference value derived at one step higher point. Since this position is two steps higher than the focal point, the latter corresponds to a position $Z_{i+2}$. Block 918 derives the difference between $Z_{i+2}$ and $Z_s$ and block 919 raises the Z table over a distance corresponding to that difference.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. An automatic dimension analyzer comprising:
   a power driven table on which an object under measurement is placed, the table being movable in orthogonal directions in a field defined by a pair of coordinate axes;
   an optical system for forming an optical image of said object in a sample point field;
   means for scanning said sample point field in a rectangular raster format to produce sample point data bits each representing a sample point having a predetermined optical level;
   means for detecting a coincidence between at least one sample point data bit and a cursor defined in said sample point field parallel with one of said coordinate axes, said cursor being movable in said sample point field;
   a memory;
   data entry means for storing measurement instructions in sequentially addressable locations of said memory;
   data processing means for addressing said memory locations to retrieve said instructions, causing one of said table and said cursor to move with respect to the other in accordance with the retrieved instructions and detecting the position of said table or said cursor relative to a reference position upon the detection of a coincidence by said coincidence detecting means,
   wherein said coincidence detecting means comprises means for generating left, right, upper and bottom window cursors in said sample point field to define a rectangular window therein, the first-mentioned cursor being located in said rectangular window, and
   means for detecting a coincidence between said sample point data bits and each one of said window cursors,
   further comprising means for counting the number of data bits derived from sample points located in said window.

2. An automatic dimension analyzer as claimed in claim 1, wherein said means for generating left, right, upper and bottom window cursors comprises means for generating a plurality of signals each having a binary level corresponding to the binary level of said data bits, and wherein said coincidence detecting means includes means for detecting a coincidence between at least one sample point data bit and each of said signals to produce a coincidence output.

3. An automatic dimension analyzer as claimed in claim 1, wherein said data processing means is operable, in response to said instructions, for sequentially performing the steps of:
   (a) causing said table to move at a given speed;
   (b) reducing the speed of said table in response to the detection of a coincidence between a data bit and one of said window cursors by said coincidence detecting means when one edge of said object coincides with one of said window cursors; and
   (c) detecting the position of said table in response to the detection of a coincidence between a data bit and the first-mentioned cursor by said coincidence detecting means when said edge coincides with the first-mentioned cursor.

4. An automatic dimension analyzer as claimed in claim 3, wherein said data processing means is further programmed to perform the steps of moving said table at a speed higher than said given speed, repeating the steps (a) to (c) to detect an opposite edge of said object opposite to the first-mentioned edge thereof and deriving a distance between the opposite edges of said object from the positions detected by the step (c) successively performed.

5. An automatic dimension analyzer as claimed in claim 3, wherein said coincidence detecting means comprises at least one flip-flop responsive to said data bits and said cursor signal to generate a coincidence signal.

6. An automatic dimension analyzer as claimed in claim 1, wherein said data processing means is programmed to perform the steps of:
inverting the binary levels of said data bits supplied from said scanning means so that said coincidence detecting means detects a coincidence between at least one inverted data bit and said cursor; and
detecting the position of said table at the instant the last-mentioned coincidence ceases to exist.

7. An automatic dimension analyzer as claimed in claim 1, wherein said optical system comprises a microscope for forming an optical image of a microscopic object.

8. An automatic dimension analyzer as claimed in claim 1, further comprising a movable support on which said optical system is mounted, said support being movable perpendicularly to said table, and means for moving said support, and said data processing means is programmed to move said support moving means to follow the surface contour of said object.

9. An automatic dimension analyzer as claimed in claim 8, wherein said data processing means is programmed to perform the steps of:
(a) causing said support moving means to move said support in a direction toward or away from said object;
(b) successively detecting the number of sample points having said predetermined binary level within a preselected area of said sample point field at successive locations of said support; and
(c) causing said support moving means to stop said support at a location in which the number of sample points having said predetermined binary level is maximum.

10. An automatic dimension analyzer as claimed in claim 9, wherein the data processing means is programmed to include in step (c) the further steps of:
($c_1$) successively dividing said number by the number of all sample points in said predetermined area to derive average values;
($c_2$) successively detecting a difference between said average values and storing said difference in a specified location of said memory corresponding to said location of said support;
($c_3$) detecting a predetermined sign of said difference which indicates that the average value derived at a succeeding location is smaller than the average value derived at a preceding location;
($c_4$) if said predetermined sign is not detected, repeating the steps ($c_1$) and ($c_2$) until said sign is detected;
($c_5$) if said predetermined sign is detected, detecting said difference which is greater than a predetermined value;
($c_6$) if said last-mentioned difference is not detected, repeating the steps ($c_1$) to ($c_5$);
($c_7$) if said last-mentioned difference is reached, causing said support moving means to stop said support;
($c_8$) determining the position of said support with respect to a reference point;
($c_9$) successively addressing said memory locations beginning with the location in which the most recently derived difference is stored until said predetermined sign is detected;
($c_{10}$) determining the position of said support corresponding to the memory location in which said predetermined sign is detected; and
($c_{11}$) causing said support moving means to move said support in an opposite direction to the position determined by the step ($c_{10}$).

11. An automatic dimension analyzer as claimed in claim 1, further comprising a visual display means for providing a display of said sample point field on a viewing screen.

12. An automatic dimension analyzer comprising:
a power driven table on which an object under measurement is placed, the table being movable in orthogonal directions in a field defined by a pair of coordinate axes;
an optical system for forming an optical image of said object in a sample point field;
means for scanning said sample point field in a rectangular raster format to produce sample point data bits each representing a sample point having a predetermined optical level;
means for detecting a coincidence between at least one sample point data bit and a cursor defined in said sample point field parallel with one of said coordinate axes, said cursor being movable in said sample point field;
a memory;
data entry means for storing measurement instructions in sequentially addressable locations of said memory; and
data processing means for addressing said memory locations to retrieve said instructions, causing one of said table and said cursor to move with respect to the other in accordance with the retrieved instructions and detecting the position of said table or said cursor relative to a reference position upon the detection of a coincidence by said coincidence detecting means,
wherein said coincidence detecting means includes means for generating a second cursor in said sample point field orthogonally intersecting the first-mentioned cursor and means for detecting a coincidence of at least one data bit simultaneously with said first and second cursors, and wherein said data processing means is programmed to perform the step of detecting the position of said table in response to the detection of the last-mentioned coincidence when one edge of said object coincides with an intersection of said first and second cursors.

13. An automatic dimension analyzer as claimed in claim 12, further comprising means for counting the number of data bits which coincide with one of said first and second cursors.

14. An automatic dimension analyzer comprising:
a power driven table on which an object under measurement is placed, the table being movable in orthogonal directions in a field defined by a pair of coordinate axes;
an optical system for forming an optical image of said object in a sample point field;
means for scanning said sample point field in a rectangular raster format to produce sample point data bits each representing a sample point having a predetermined optical level;

means for detecting a coincidence between at least one sample point data bit and a cursor defined in said sample point field parallel with one of said coordinate axes, said cursor being movable in said sample point field;

a memory;

data entry means for storing measurement instructions in sequentially addressable locations of said memory; and data processing means for addressing said memory locations to retrieve said instructions, causing one of said table and said cursor to move with respect to the other in accordance with the retrieved instructions and detecting the position of said table or said cursor relative to a reference position upon the detection of a coincidence by said coincidence detecting means, wherein said data processing means is programmed to perform the steps of causing said cursor to move from a predetermined position to a measurement point on said object and determining the displacement of said measurement point with respect to said predetermined position in response to the detection of a coincidence between a data bit and said cursor by said coincidence detecting means when said cursor coincides with said measurement point.

15. An automatic dimension analyzer comprising:

a power driven table on which an object under measurement is placed, the table being movable in orthogonal directions in a field defined by a pair of coordinate axes;

an optical system for forming an optical image of said object in a sample point field;

means for scanning said sample point field in a rectangular raster format to produce sample point data bits each representing a sample point having a predetermined optical level;

means for detecting a coincidence between at least one sample point data bit and a cursor defined in said sample point field parallel with one of said coordinate axes, said cursor being movable in said sample point field;

a memory;

data entry means for storing measurement instruction in sequentially addressable locations of said memory; and data processing means for addressing said memory locations to retrieve said instructions, causing one of said table and said cursor to move with respect to the other in accordance with the retrieved instructions and detecting the position of said table or said cursor relative to a reference position upon the detection of a coincidence by said coincidence detecting means, wherein said coincidence detecting means comprises means for generating left, right, upper and bottom window cursors in said sample point field to define a rectangular window therein, the first-mentioned cursor being located in said rectangular window, and means for detecting a coincidence between said sample point data bits and each one of said window cursors, each of said window cursors being movable in said sample point field, said data processing means being programmed to perform the steps of:

(a) causing at least one pair of said window cursors to move relative to one another to opposite edges of the optical image of said object from predetermined positions which are defined by the area of said object;

(b) determining the positions of said opposite edges in response to the successive detection of a coincidence between a data bit and each of the cursors of the pair by said coincidence detector when said window cursors of said pair coincide with each of the opposite edges of said object; and (c) deriving a distance between said opposite edges from the positions determined by the step (b).

16. An automatic dimension analyzer as claimed in claim 15, wherein said data processing means is futher programmed to perform the step of causing said at least one pair of said window cursors to move relative to one another by moving inwardly toward each other to said opposite edges of the optical image of said object, said predetermined positions being located outside the area of said object in said sample point field.

17. An automatic dimension analyzer as claimed in claim 15, wherein said data processing means is further programmed to perform the step of causing said at least one pair of said window cursors to move relative to one another by moving outwardly in directions away from each other to said opposite edges of the optical image of said object, said predetermined positions being located within the area of said object.

18. An automatic dimension analyzer comprising:

a power driven table on which an object under measurement is placed, the table being movable in orthogonal directions in a field defined by a pair of coordinate axes;

an optical system for forming an optical image of said object in a sample point field;

means for scanning said sample point field in a rectangular raster format to produce sample point data bits each representing a sample point having a predetermined optical level;

means for detecting a coincidence between at least one sample point data bit and a cursor defined in said sample point field parallel with one of said coordinate axes, said cursor being movable in said sample point field;

a memory;

data entry means for storing measurement instructions in sequentially addressable locations of said memory; and data processing means for addressing said memory locations to retrieve said instructions, causing one of said table and said cursor to move with respect to the other in accordance with the retrieved instructions and detecting the position of said table or said cursor relative to a reference position upon the detection of a coincidence by said coincidence detecting means, wherein said coincidence detecting means comprises a clock source, counter means for counting clock pulses from said clock source for generating an address code, and read-write memory means, wherein said data processing means is programmed to perform the steps of addressing said memory means to write binary 1's in a series of locations specified by said retrieved instructions and addressing locations specified by said address codes to read the binary 1's from said memory means.

19. An automatic dimension analyzer comprising:

a power driven table on which an object under measurement is placed, the table being movable in orthogonal directions in a field defined by a pair of coordinate axes;

an optical system for forming an optical image of said object in a sample point field;

means for scanning said sample point field in a rectangular raster format to produce sample point data bits each representing a sample point having a predetermined optical level;

means for detecting a coincidence between at least one sample point data bit and a cursor defined in said sample point field parallel with one of said coordinate axes, said cursor being movable in said sample point field;

a memory;

data entry means for storing measurement instructions in sequentially addressable locations of said memory; and data processing means for addressing said memory locations to retrieve said instructions, causing one of said table and said cursor to move with respect to the other in accordance with the retrieve instructions and detecting the position of said table or said cursor relative to a reference position upon the detection of a coincidence by said coincidence detecting means, wherein said scanning means comprises a solid-state image sensor on which said optical image is formed and means for causing said sensor to scan the optical image in rectangular raster format.

20. An automatic dimension analyzer comprising:

a power driven table on which an object under measurement is placed, the table being movable in orthogonal directions in a field defined by a pair of coordinate axes;

an optical system for forming an optical image of said object in a sample point field;

first means for scanning said sample point field in a rectangular raster format to produce sample point data bits each representing a sample point having a predetermined optical level;

second means for defining a pair of X and Y cursors orthogonally intersecting each other in said sample point field respectively parallel with said coordinate axes and detecting a coincidence between at least one sample point data bit and each one of said X and Y cursors;

a memory;

data entry means for storing measurement instructions in sequentially addressable locations of said memory; and data processing means for addressing said memory locations to retrieve said instructions, causing said table to move with respect to said cursor in accordance with the retrieved instructions and detecting the position of said table relative to a reference point upon the detection of a coincidence by said second means wherein said data processing means is programmed to perform the steps of:

inverting the binary levels of said data bits supplied from said first means so that said second means detects a coincidence between at least one inverted data bit and one of said X and Y cursors; and detecting the position of said table at the instant the last mentioned coincidence ceases to exist.

21. An automatic dimension analyzer as claimed in claim 20, wherein said second means comprises a clock source, counter means for counting clock pulses from said clock source for generating an address code, and read-write memory means, wherein said data processing means is programmed to perform the steps of addressing said memory means to write binary 1's in a series of locations specified by said retrieved instructions and addressing said memory means to read the binary 1's from locations specified by said address code.

22. An automatic dimension analyzer as claimed in claim 20, wherein said optical system comprises a microscope for forming an optical image of a microscopic object.

23. An automatic dimension analyzer as claimed in claim 20, further comprising a movable support on which said optical system is mounted, said support being movable perpendicularly to said table, and means for moving said support, and said data processing means is programmed to move said support moving means to follow the surface contour of said object.

24. An automatic dimension analyzer as claimed in claim 23, wherein said data processing means is programmed to perform the steps of:

(a) causing said support moving means to move said support in a direction toward or away from said object;

(b) successively detecting the number of sample points having said predetermined binary level within a preselected area of said sample point field at successive locations of said support; and (c) causing said support moving means to stop said support at a location in which the number of sample points having said predetermined binary level is maximum.

25. An automatic dimension analyzer comprising:

a power driven table on which an object under measurement is placed, the table being movable in orthogonal directions in a field defined by a pair of coordinate axes;

an optical system for forming an optical image of said object in a sample point field;

first means for scanning said sample point field in a rectangular raster format to produce sample point data bits each representing a sample point having a predetermined optical level;

second means for defining a pair of X and Y cursors orthogonally intersecting each other in said sample point field respectively parallel with said coordinate axes and detecting a coincidence between at least one sample point data bit and each one of said X and Y cursors;

a memory;

data entry means for storing measurement instructions in sequentially addressable locations of said memory; and data processing means for addressing said memory locations to retrieve said instructions, causing said table to move with respect to said cursor in accordance with the retrieved instructions and detecting the position of said table relative to a reference point upon the detection of a coincidence by said second means, where in said second means comprises means for generating a pair of column cursors parallel with the oppositely spaced from said X cursor and a pair of row cursors parallel with and oppositely spaced from said Y cursor, said column and row cursors defining a window in said sample point field, and means for detecting a coincidence between said data bit and each one of said column and row cursors, said data processing means being programmed to sequentially perform the steps of:
(a) causing said table to move at a given speed in a direction parallel with one of said coordinate axes;
(b) reducing the speed of said table in response to the detection of a coincidence between a data bit and one of said column and row cursors by said coincidence detecting means when one edge of said object coincides with said window; and
(c) detecting the position of said table in response to the detection of a coincidence between a data bit and one of said X and Y cursors by said coincidence detecting means when said one edge of the object coincides with said X or Y cursor.

26. An automatic dimension analyzer as claimed in claim 25, wherein said data processing means is further programmed to perform the steps of moving said table at a speed higher than said given speed subsequent to the step (c) over a preset distance, repeating the steps (a) to (c) to detect another edge of said object opposite to the first-mentioned edge thereof by successive occurrences of coincidence between said another edge of said column and row cursors and said one of said X and Y cursors, and the step of deriving a distance between the opposite edges of the object from the positions detected by the step (c) successively performed.

27. An automatic dimension analyzer as claimed in claim 25, wherein said second means comprises means for generating a plurality of cursor signals each having a binary level corresponding to the binary level of said data bits, and means for detecting a coincidence between at least one sample point data bit and each one of said cursor signals to produce a coincidence output.

28. An automatic dimension analyzer as claimed in claim 27, wherein said second means comprises at least one flip-flop responsive to said data bits and each of said cursor signals to generate a coincidence signal.

29. An automatic dimension analyzer comprising:
an optical system for forming an optical image of an object under measurement in a sample point field;
means for scanning said sample point field in a rectangular raster format to produce sample point data bits each representing a sample point having a predetermined optical level;
means for generating a pair of spaced-apart column window cursors and a pair of spaced-apart row window cursors forming with said column window cursors a rectangular window in said sample point field, each of said window cursors being movable with respect to the other of the same pair to vary the size of said rectangular window;
means coupled to said cursor generating means and to said scanning means for detecting a coincidence between at least one sample point data bit and each one of said window cursors;
a memory;
data entry means for storing measurement instructions in sequentially addressable locations of said memory; and
data processing means for addressing said memory locations to recall said instructions, causing one of said window cursors to move with respect to the other of the same pair in accordance with the recalled instructions and detecting the position of said moved cursor relative to a reference point upon the detection of a coincidence by said coincidence detecting means,
wherein said data processing means is programmed to perform the steps of:
(a) causing at least one pair of said window cursors to move relative to one another to opposite edges of said object from predetermined positions which are defined by the area of said object;
(b) determining the positions of said opposite edges in response to the successive detection of a coincidence between a data bit and each of the cursors of the pair by said coincidence detector when said window cursors of said pair coincide with each of the opposite edges of said object; and
(c) deriving a distance between said opposite edges from the positions determined by the step (b).

30. An automatic dimension analyzer as claimed in claim 29, wherein said data processing means is further programmed to perform the step of causing said at least one pair of said window cursors to move relative to one another by moving inwardly toward each other to said opposite edges of said object, said predetermined positions being located outside the area of said object in said sample point field.

31. An automatic dimension analyzer as claimed in claim 29, wherein said data processing means is further programmed to perform the step of causing said at least one pair of said window cursors to move relative to one another by moving outwardly in directions away from each other to said opposite edges of said object, said predetermined positions being located within the area of said object.

32. A method of analyzing the dimensions of an object placed on a movable table, comprising the steps of:
(a) forming an optical image of said object on a sample point field;
(b) scanning said sample point field in a rectangular raster format and generating sample point data bits each representing a sample point having a predetermined optical level;
(c) moving one of said table and a cursor relative to the other so that the sample points representing said object move toward said cursor, said cursor being defined in said sample point field parallel with one of coordinate axes of said field and movable therein;
(d) detecting a coincidence between at least one data bit and said cursor; and
(e) detecting the position of said table or the position of said cursor with respect to a reference point upon the detection of a coincidence by the step (d), and further
(f) forming a second cursor parallel with and spaced from the first-mentioned cursor,
said step (c) comprising moving said table toward said second cursor at a higher speed at first, then at a lower speed when said one data bit coincides with said second cursor and moving said table toward said first cursor at the lower speed until said one data bit coincides with the first-mentioned cursor.

33. A method as claimed in claim 32, further comprising the step of inverting all the sample points in said sample point field so that the inverted data bits represent a background of said object, wherein the step (e) comprises detecting a coincidence between at least one inverted data bit and said cursor and detecting when said coincidence ceases to exist, and wherein the step (f)

comprises the step of detecting the position of said table when the cessation of said coincidence is detected.

34. A method as claimed in claim 32, further comprising the step of forming a second cursor orthogonally intersecting the first-mentioned cursor, wherein the step (c) comprises moving said table so that the data bits representing said object approach an intersection of said first and second cursors, and the step (d) comprises detecting a coincidence between a sample point defining an edge of said object and said intersection.

35. A method as claimed in claim 32, further comprising the step of forming a second movable cursor parallel with and spaced from the first-mentioned cursor, wherein the step (c) comprises moving said first and second cursors inwardly to each other toward peripheral edges of the data bits representing said object from predetermined positions, and the step (d) comprises detecting when said first and second cursors coincide with sample points defining said peripheral edges, and the step (e) comprises detecting the positions of said first and second cursors upon the occurrence of said coincidences of said first and second cursors with said data bits, and wherein the method further includes the step of deriving the distance between said first and second cursors from said detected positions.

36. A method as claimed in claim 32, further comprising the step of forming a second movable cursor parallel with and spaced from the first-mentioned cursor, wherein the step (c) comprises moving said first and second cursors outwardly from each other toward peripheral edges of the data bits representing said object from predetermined positions, and the step (d) comprises detecting when said first and second cursors coincide with sample points defining said peripheral edges, and the step (e) comprises detecting the positions of said first and second cursors upon the occurrence of said coincidences of said first and second cursors with said data bits, and wherein the method further includes the step of deriving the distance between said first and second cursors from said detected positions.

* * * * *